US012289506B2

(12) United States Patent
Harviainen et al.

(10) Patent No.: US 12,289,506 B2
(45) Date of Patent: *Apr. 29, 2025

(54) METHOD FOR USING VIEWING PATHS IN NAVIGATION OF 360° VIDEOS

(71) Applicant: InterDigital Madison Patent Holdings, SAS, Paris (FR)

(72) Inventors: Tatu V J Harviainen, Helsinki (FI); Marko Palviainen, Espoo (FI)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,067

(22) Filed: Aug. 12, 2022

(65) Prior Publication Data

US 2022/0394355 A1    Dec. 8, 2022

Related U.S. Application Data

(63) Continuation of application No. 16/954,116, filed as application No. PCT/US2018/065230 on Dec. 12, 2018, now Pat. No. 11,451,881.

(Continued)

(51) Int. Cl.
*H04N 21/81* (2011.01)
*G02B 27/01* (2006.01)
(Continued)

(52) U.S. Cl.
CPC ......... *H04N 21/816* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS

| 5,655,085 A | 8/1997 | Ryan et al. |
| 5,794,207 A | 8/1998 | Walker et al. |

(Continued)

FOREIGN PATENT DOCUMENTS

| CN | 104243961 A | 12/2014 |
| CN | 104270616 A | 1/2015 |

(Continued)

OTHER PUBLICATIONS

Neges et al., "Combining Visual Natural Markers and IMU for Improved AR Based Indoor Navigation" (Year: 2015).*

(Continued)

*Primary Examiner* — Hilina K Demeter
(74) *Attorney, Agent, or Firm* — Smadar Gefen

(57) ABSTRACT

Systems and methods are described for displaying 360-degree video using a viewing direction and/or a viewport position that is determined based on a user-selected level of automation. If full automation is selected by the user, the viewing direction and/or viewport position is determined by a defined viewing path. If partial automation is selected, the viewing direction and/or viewport position is determined by user input in combination with the defined viewing path. For example, a high-pass-filtered version of the user input may be added to the defined viewing path to obtain a partially-automated viewing direction and/or viewpoint position. Example systems and methods may be implemented using a head-mounted display.

21 Claims, 9 Drawing Sheets

Related U.S. Application Data

(60) Provisional application No. 62/599,525, filed on Dec. 15, 2017.

(51) Int. Cl.

| | |
|---|---|
| *G06F 3/01* | (2006.01) |
| *G06F 16/787* | (2019.01) |
| *G06T 19/00* | (2011.01) |
| *H04N 21/2668* | (2011.01) |
| *H04N 21/6587* | (2011.01) |

(52) U.S. Cl.
CPC .......... *G06F 16/787* (2019.01); *G06T 19/003* (2013.01); *H04N 21/2668* (2013.01); *H04N 21/6587* (2013.01)

(56) References Cited

U.S. PATENT DOCUMENTS

| | | | |
|---|---|---|---|
| 5,818,955 | A | 10/1998 | Smithies et al. |
| 7,096,428 | B2* | 8/2006 | Foote .................. G06F 3/04815 |
| | | | 707/E17.018 |
| 8,633,964 | B1 | 1/2014 | Zhu |
| 9,485,493 | B2 | 11/2016 | Wei et al. |
| 9,573,062 | B1 | 2/2017 | Long et al. |
| 2012/0092348 | A1 | 4/2012 | Mccutchen |
| 2012/0249527 | A1 | 10/2012 | Noda |
| 2015/0022935 | A1 | 1/2015 | Cox et al. |
| 2016/0093105 | A1 | 3/2016 | Rimon et al. |
| 2016/0191796 | A1 | 6/2016 | Mate et al. |
| 2016/0259403 | A1 | 9/2016 | Wang et al. |
| 2017/0026577 | A1 | 1/2017 | You et al. |
| 2017/0124398 | A1* | 5/2017 | Birkbeck ............... G06V 20/46 |
| 2017/0139578 | A1 | 5/2017 | Dickerson et al. |
| 2017/0221264 | A1 | 8/2017 | Perry et al. |
| 2017/0244948 | A1 | 8/2017 | Pang et al. |
| 2017/0332064 | A1* | 11/2017 | Martineau ............. G06T 19/006 |
| 2017/0336705 | A1* | 11/2017 | Zhou ......................... G01S 3/00 |
| 2018/0004285 | A1* | 1/2018 | Castleman ....... G11B 20/10527 |
| 2018/0165879 | A1* | 6/2018 | Holzer .................... G06F 3/011 |
| 2018/0343387 | A1* | 11/2018 | Bostick .................. G06V 20/20 |
| 2019/0020816 | A1* | 1/2019 | Shan ...................... G06V 20/40 |

FOREIGN PATENT DOCUMENTS

| | | |
|---|---|---|
| CN | 105843541 A | 8/2016 |
| CN | 106445437 A | 2/2017 |
| CN | 106954093 A | 7/2017 |
| CN | 107431801 A | 12/2017 |
| WO | WO2015054235 A1 | 4/2015 |
| WO | WO2017062289 A1 | 4/2017 |

OTHER PUBLICATIONS

Noronha et al., "Sharing and Navigating 360 Videos and Maps in Sight Surfers" (Year: 2012).*
Choi, B. et al., "WD on ISO/IEC 23000-20 Omnidirectional Media Application Format." ISO/IEC JTC1/SC29/WG11 N16189 Jun. 2016 (42 pages).
Anonymous, "Part 12: ISO Base Media File Format", International Organization for Standardization (ISO) & International Electrotechnical Commission (IEC), Information Technology—Coding of audiovisual objects, International Standard ISO/IEC 14496-12, Fifth Edition, Feb. 20, 2015, 256 pages.
"3rd Generation Partnership Project, Technical Specification Group Radio Access Network, Evolved Universal Terrestrial Radio Access (E-UTRA), Physical layer procedures (Release 11)", 3GPP TS 36.213 V11.4.0, Sep. 2013, 182 pages.
Lo, W. et al., "360° Video Viewing Dataset in Head-Mounted Virtual Reality" In the Proceedings of the 8th ACM on Multimedia Systems Conference. Jun. 2017 pp. 211-216 (6 pages).
3rd Generation Partnership Project (3GPP), TS 36.211 V11.4.0, 3rd Generation Partnership Project; Technical Specification Group Radio Access Network; Evolved Universal Terrestrial Radio Access (E-UTRA); Physical channels and modulation (Release 11), Sep. 2013, 120 pages.
Ulenius, M. "Navigating using 360° Panoramic Video: Design Challenges and Implications." 2017 (12 pages).
"Information technology Dynamic adaptive streaming over HTTP (DASH)—Part 1: Media presentation description and segment formats", ISO/IEC 23009-1, First edition 2012, Apr. 1, 2012, 134 pages.
Sheikh, A., et al., "Directing attention in 360-degree video." BBC Research and Development 2016 (9 pages).
Neng, Luis AR; Chambel, Teresa. Get around 360° hypervideo. In: Proceedings of the 14th International Academic MindTrek Conference: Envisioning Future Media Environments. ACM, 2010. pp. 119-122 (4 pages).
Noronha, Gonçalo; Álvares, Carlos; Chambel, Teresa. Sharing and navigating 360° videos and maps in sight surfers. In: Proceeding of the 16th International Academic MindTrek Conference. ACM, 2012. p. 255-262.
Kimber, D., et al., "Flyabout: spatially indexed panoramic video." In Proceedings of the ninth ACM international conference on Multimedia, 2001 pp. 339-347 (10 pages).
Al-Hajri, A., et al., "Video navigation with a personal viewing history." In IFIP Conference on Human-Computer Interaction, Springer, Berlin, Heidelberg, 2013 (18 pages).
International Preliminary Report on Patentability for PCT/US2018/065230 completed on Jan. 22, 2020, 14 pages.
Kuzyakov, Evgeny, et. al.,: "Next-generation video encoding techniques for 360 video and VR". Online: [facebook] Video engineering, virtual reality, https://code.facebook.com/posts/1126354007399553. Jan. 21, 2016, 5 pages.
Written Opinion of the International Preliminary Examining Authority for PCT/US18/65230 mailed Nov. 19, 2019, 7 pages.
"3rd Generation Partnership Project, Technical Specification Group Radio Access Network, Evolved Universal Terrestrial Radio Access (E-UTRA), Multiplexing and channel coding (Release 11)", 3GPP TS 36.212 V11.3.0, Jun. 2013, 84 pages.
3rd Generation Partnership Project (3GPP), TS 36.304 V12.1.0, "Technical Specification Group Radio Access Network, Evolved Universal Terrestrial Radio Access (E-UTRA), User Equipment (UE) Procedures in Idle Mode (Release 12)", Jun. 2014, pp. 1-35.
DASH, IF. "Guidelines for Implementation: DASH-IF Interoperability Points, Version 3.2." In DASH Interoperability Forum. Dec. 24, 2015 (166 pages).
https://www.instavr.co/articles/general/guided-vr-co-viewing-why-this-new-instavr-module-is-the-future-of-vr-collaboration 2015-2021 accessed on Nov. 4, 2021 (7 pages).
International Search Report and Written Opinion of the International Searching Authority for PCT/US2018/065230 mailed Mar. 19, 2019, 12 pages.
3rd Generation Partnership Project (3GPP), TS 36.331 V11.4.0, "Technical Specification Group Radio Access Network, Evolved Universal Terrestrial Radio Access (E-UTRA), Radio Resource Control (RRC), Protocol Specification (Release 11)", Jun. 2013, pp. 1-346.
Anonymous, "Information Technology—Generic coding of moving pictures and associated audio information: Systems", International Organization for Standardization (ISO) and the International Electrotechnical Commission (IEC), Document: ISO/IEC 13818-1, Second edition, Dec. 1, 2000, 174 pages.
Hu et al., "Research on the Implementation of Museum Network Virtual Display Based on Panoramic Technology", Museum Research, No. 01, Mar. 10, 2015, pp. 12-17.

* cited by examiner

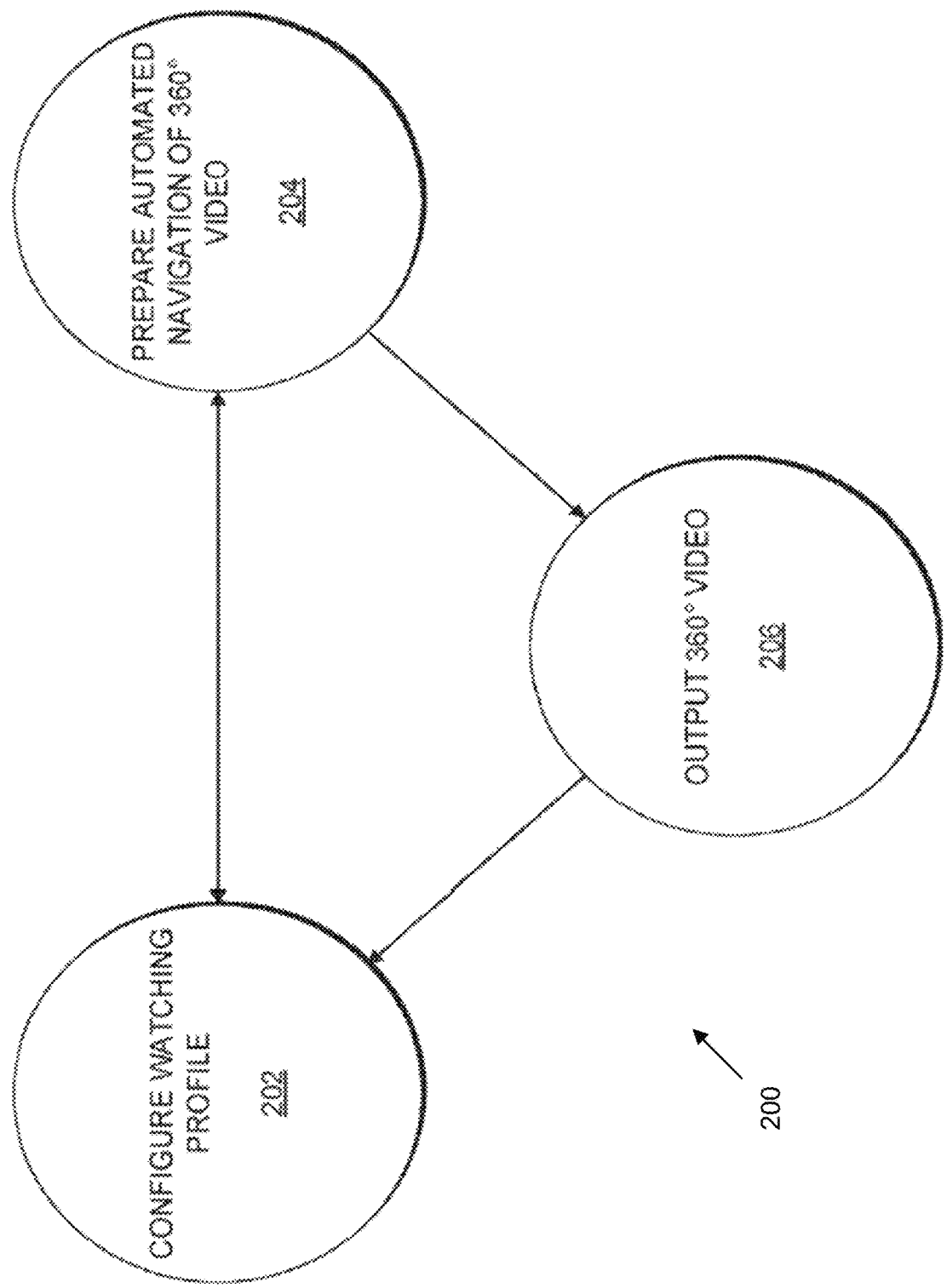

GENERATING, FOR EACH OF AT LEAST TWO AVAILABLE WATCHING PROFILES, METADATA DESCRIBING A SPATIOTEMPORAL SUBSET OF 360-DEGREE VIDEO CONTENT
802

GENERATING, FOR EACH OF THE AT LEAST TWO AVAILABLE WATCHING PROFILES, METADATA DESCRIBING AT LEAST ONE LEVEL OF GUIDANCE FOR DIRECTING A USER THROUGH THE SPATIOTEMPORAL SUBSET OF THE 360-DEGREE VIDEO CONTENT
804

METHOD FOR USING VIEWING PATHS IN NAVIGATION OF 360° VIDEOS

CROSS-REFERENCE TO RELATED APPLICATIONS

This application is a Continuation of U.S. application Ser. No. 16/954,116, filed Jun. 15, 2020 which is a National Phase entry under 35 U.S.C. § 371 of International Application No. PCT/US2018/065230, filed Dec. 12, 2018, which claims the benefit of U.S. Provisional Patent Application Ser. No. 62/599,525, filed Dec. 15, 2017, which is incorporated by reference herein in its entirety.

BACKGROUND

In many previous non-360° video systems, the user must look at the video from the angle used for recording. With 360° video recording, users may look in more directions. In the article Luis Neng and Teresa Chembel, *Get Around 360° HypeNideo*, Proceedings of the 14th International Academic MindTrek Conference: Envisioning Future Media Environments (MindTrek '10) (Oct. 6-8, 2010, Tampere, Finland), ACM (2010), the authors describe a Hypervideo system that enables users to enter a web-based immersive environment where users pan through content to view Hypervideos at different angles and click on hyperlinks to view information. In the article GonQalo Noronha, et al., *Sharing and Navigating 360° Videos and Maps in Sight Surfers*, Proceedings of the 16th International Academic MindTrek Conference (MindTrek '12) (Oct. 3-5, 2012, Tampere, Finland), ACM (2012), the authors describe design issues for a web application used for interacting with georeferenced 360° hypervideos.

For an extension of the DASH protocol that supports Virtual Reality (VR), there are options to signal the recommended viewport and initial viewport values in the Omnidirectional Media Application Format (OMAF). The recommended viewport may describe a region to use, such as for extracting a 2D scene. An initial viewport indicates the suggested starting direction if performing a random access into a 360° video. Many interactive viewport adaptive and tile-based streaming systems only adapt the content delivery to the user viewing direction.

SUMMARY

Disclosed herein are systems and methods for assisting in navigation of 360° videos and for providing adapted/automated 360° video experiences for different users (such as passive or active HMO users). Systems and methods disclosed herein enable automated watching of 360° videos and provide additional effects (such as rapidly jumping viewports or more than 180 degrees moves around) that are not achievable in most immersive 360° videos because these effects would break a user's neck or require a user to stand.

In most 2D videos, the director is in complete control of where the camera points. For many previous 360° video systems, the north direction is fixed while the viewer navigates independently around the content, and the producer has little control over the user's path through the content. For many previous 360° video systems, there is little or no guidance for how a user is to move through a video, other than a time code of when an event occurs in a video.

Systems and methods disclosed herein may provide levels of automation for viewing of 360° videos. A content author (e.g., a director) may include video events and a watching profile that delineates a content author's suggested reaction to the content, such as a slow pan or a hard cut to a given viewing direction. For one embodiment, the presence of a video event may trigger a gaze direction computation to override the guided and HMO orientation derived viewports and to replace those viewports with a viewport computed from an event type and user preference in a watching profile. Systems and methods disclosed herein provide guided navigation of 360° videos and enable presentation of adapted/automated 360° video experiences for different types of users and use cases.

Some embodiments of a method may include: receiving, at a 360-degree video content viewing device, metadata describing at least two available watching profiles for 360-degree video content, each available watching profile associated with a spatiotemporal subset of the 360-degree video content, each available watching profile specifies at least a level of guidance for directing a user through the spatiotemporal subset of the 360-degree video content; displaying, to the user, information describing the available watching profiles; receiving, from the user, input selecting one of the available watching profiles; displaying, on the 360-degree video content viewing device, the 360-degree video content; and directing the user to watch the spatiotemporal subset of the 360-degree video content associated with the selected watching profile using the level of guidance specified by the selected watching profile.

In some embodiments of a method, for each available watching profile, the spatiotemporal subset of the 360-degree video content may include information highlighting spatial locations on a timeline of the 360-degree video content.

Some embodiments of a method may further include: determining, for at least one of the at least two available watching profiles, a recommended viewport of the 360-degree video content; and adjusting a viewport of the displayed 360-degree video content based on the recommended viewport of the 360-degree video content.

With some embodiments of a method, for each available watching profile, the spatiotemporal subset of the 360-degree video content may include a path through time and space, and for each available watching profile, the path may include information used to determine at least one recommended viewport of the 360-degree video content.

For some embodiments of a method, at least one of the available watching profiles may include a deviation threshold between the path and a gaze direction of the 360-degree video content.

In some embodiments of a method, displaying the 360-degree video content may include displaying at least one viewport of the 360-degree video content corresponding to the path through time and space for the selected watching profile.

With some embodiments of a method, for each available watching profile, the spatiotemporal subset of the 360-degree video content may include: (i) a first path through time and space associated with position of the user, and (ii) a second path through time and space associated with viewing direction of the user.

For some embodiments of a method, the first available watching profile may include a first deviation threshold between a path through time and space and a gaze direction of the 360-degree video content, the second available watching profile may include a second deviation threshold between the path through time and space and the gaze direction of the 360-degree video content, and the first deviation threshold may be less than the second deviation threshold.

In some embodiments of a method, the first available watching profile may include a first path through time and space, and the second available watching profile may include a second path through time and space.

Some embodiments of a method may further include adjusting a viewport of the displayed 360-degree video content based on at least one of an orientation measurement of the 360-degree video content viewing device and a boundary threshold.

For some embodiments of a method, directing the user to watch the spatiotemporal subset of the 360-degree video content associated with the selected watching profile using the level of guidance specified by the selected watching profile may include adjusting a viewport of the displayed 360-degree video content based on a path through time and space specified in the selected watching profile.

In some embodiments of a method, for each available watching profile, the spatiotemporal subset of the 360-degree video content may include at least one viewport of the 360-degree video content at a point in time within the 360-degree video content, for each available watching profile, at least one level of guidance indicates a level of automated navigation to at least one viewport used in displaying the 360-degree video content, and each of the available watching profiles may further include: metadata describing at least one limit on user interactivity, and metadata describing at least one transition effect associated with a viewport of the 360-degree video content.

For some embodiments of a method, each of the at least one limit on user interactivity may be selected from the group consisting of maximum panning speed, maximum angle of deviation from a viewport location, movement gain, a confinement of movement to an axis of movement, and a movement boundary.

Some embodiments of a method may further include: receiving information indicating a video event within the 360-degree video content; determining a transition effect method for handling the video event; and performing the transition effect method for handling the video event.

Some embodiments of a method may include: generating, for each of at least two available watching profiles, metadata describing a spatiotemporal subset of 360-degree video content; and generating, for each of the at least two available watching profiles, metadata describing at least one level of guidance for directing a user through the spatiotemporal subset of the 360-degree video content.

Some embodiments of a method may further include: generating, for each of the at least two available watching profiles, metadata describing a limit on user interactivity; and generating, for each of the at least two available watching profiles, metadata describing a transition effect method for guiding a user to a viewport of the 360-degree video content.

In some embodiments of a method, for each of the at least two available watching profiles, the spatiotemporal subset of the 360-degree video content may include a path through time and space; generating, for each of the at least two available watching profiles, metadata describing the spatiotemporal subset of the 360-degree video content may include generating information used to determine at least one recommended viewport of the 360-degree video content; and generating, for each of the at least two available watching profiles, metadata describing a limit on user interactivity may include generating a deviation threshold between the path and a gaze direction of the 360-degree video content.

For some embodiments of a method, generating, for each of at least two available watching profiles, metadata describing a spatiotemporal subset of the 360-degree video content may include: generating metadata describing a first path through time and space associated with torso movement of the user; and generating metadata describing a second path through time and space associated with head movement of the user.

Some embodiments of a method may further include: generating, for at least one of the at least two available watching profiles, metadata describing a video event in the 360-degree video content; and generating, for at least one of the at least two available watching profiles, metadata describing a transition effect method for handling a viewport associated with the video event.

Some embodiments of a device may include: a processor; and a non-transitory computer-readable medium storing instructions that are operative, when executed on the processor, to perform a method described above.

Some embodiments of a method may include: receiving 360-degree video content; receiving information defining a viewing path through the video content; receiving a user selection of a level of directional automation for viewing of the video content from among a plurality of available levels, wherein at least one available level of directional automation is a level of partial directional automation; determining a current viewing direction for the video content, wherein, in response to user selection of the level of partial directional automation, the current viewing direction is a predetermined function of at least (i) user directional input and (ii) the defined viewing path; and displaying the 360-degree video content with the current viewing direction.

For some embodiments of a method, under the predetermined function, the current viewing direction may be a weighted sum of (i) a current high-pass filtered version of the user directional input and (ii) a current direction of the defined viewing path.

For some embodiments of a method, under the predetermined function, an incremental change in determined viewing direction may be a weighted sum of (i) a current incremental change in user directional input and (ii) a correction toward a current direction on the defined viewing path.

For some embodiments of a method, under the predetermined function, the current viewing direction may be subject to a predetermined maximum angle of deviation from a current direction of the defined viewing path.

For some embodiments of a method, displaying the 360-degree video content with the current viewing direction comprises displaying a viewport substantially centered on the current viewing direction.

For some embodiments of a method, displaying the 360-degree video content may be performed on a display device, and the user directional input may include a measurement of a direction of the display device with respect to real space.

For some embodiments of a method, the display device may be a head-mounted display.

For some embodiments of a method, at least one available level of directional automation may be a level of full directional automation, and in response to user selection of the level of full directional automation, the current viewing direction may be a current direction on the defined viewing path.

For some embodiments of a method, the information defining the viewing path may include a plurality of view angle coordinates associated with respective times.

For some embodiments of a method, at least two different viewing paths may be available for the receiving 360-degree video content, and the receiving of information defining a viewing path may be performed in response to user selection of one of the available viewing paths.

Some embodiments of a method may further include: receiving information describing the available levels of directional automation; and displaying the information describing the available levels of directional automation prior to user selection of a level of directional automation.

For some embodiments of a method, the 360-degree video content may include content having at least one positional degree of freedom, and the viewing path may include a defined positional path through the content, the method further including: receiving a user selection of a level of positional automation from among a plurality of available levels; and determining a current viewpoint position for the video content based on at least one of (i) user positional input and (ii) the defined positional path; wherein the 360-degree video content may be displayed with the current viewpoint position.

For some embodiments of a method, the selected level of positional automation may be a level of full positional automation, and the current viewpoint position may be a current position on the predetermined positional path.

For some embodiments of a method, the selected level of positional automation may be a level of partial directional automation, and the current viewpoint position may be a predetermined function of at least (i) the user positional input and (ii) the defined positional viewing path.

Some embodiments of a device may include: a processor; and a non-transitory computer-readable medium storing instructions that are operative, when executed on the processor, to perform any of the methods listed herein.

BRIEF DESCRIPTION OF THE DRAWINGS

A more detailed understanding may be had from the following description, presented by way of example in conjunction with the accompanying drawings. Furthermore, like reference numerals in the figures indicate like elements.

FIG. 2 is a flowchart illustrating an example process for viewing 360° videos with a guided viewport according to some embodiments.

FIG. 8 is a flowchart illustrating an example process for generating watching profile metadata for 360-degree video content according to some embodiments.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment," For brevity and clarity of presentation, this implied leading clause is not repeated ad nauseum in the detailed description of the drawings.

DETAILED DESCRIPTION

Example Networks for Implementation of Systems and Methods Described Herein

A wireless transmit/receive unit (WTRU) may be used as a head mounted display (HMO) device in embodiments described herein.

Figure 1A:
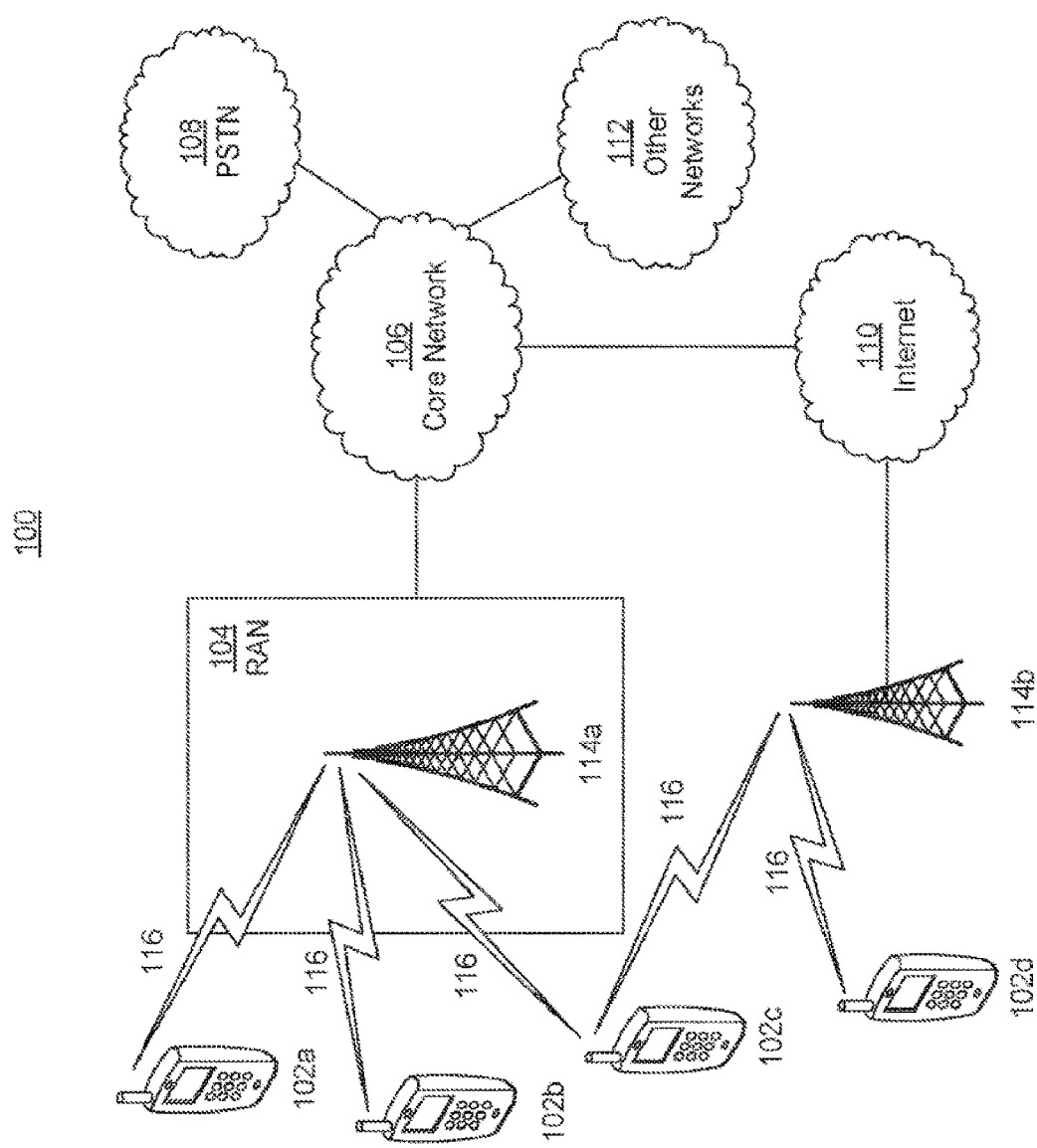
FIG. 1A is a system diagram of an example system illustrating an example communications system according to some embodiments.

FIG. 1A is a diagram illustrating an example communications system 100 in which one or more disclosed embodiments may be implemented. The communications system 100 may be a multiple access system that provides content, such as voice, data, video, messaging, and broadcast, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TOMA), frequency division multiple access (FDMA), orthogonal FDMA (OFDMA), single-carrier FOMA (SC-FOMA), zero-tail unique-word OFT-Spread OFOM (ZT UW OTS-s OFOM), unique word OFOM (UW-OFOM), resource block-filtered OFOM, and filter bank multicarrier (FBMC).

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (POA), a smartphone, a laptop, a netbook, a personal computer, a wireless sensor, a hotspot or Mi-Fi device, an Internet of Things (IoT) device, a watch or other wearable, a head-mounted display (HMO), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode-B, a Home Node B, a Home eNode-B, a gNB, a NR NodeB, a site controller, an access point (AP), a wireless router, and the like. While the base stations 114a, 114b are each depicted as a single element, the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), and relay nodes. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), and visible light). The air interface 116 may be established using any suitable radio access technology (RAT).

More specifically, as noted above, the communications system 100 may be a multiple access system and may employ one or more channel access schemes, such as CDMA, TOMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, and NR) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, and/or perform high-level security functions, such as user authentication. Although not shown in FIG. 1A, the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
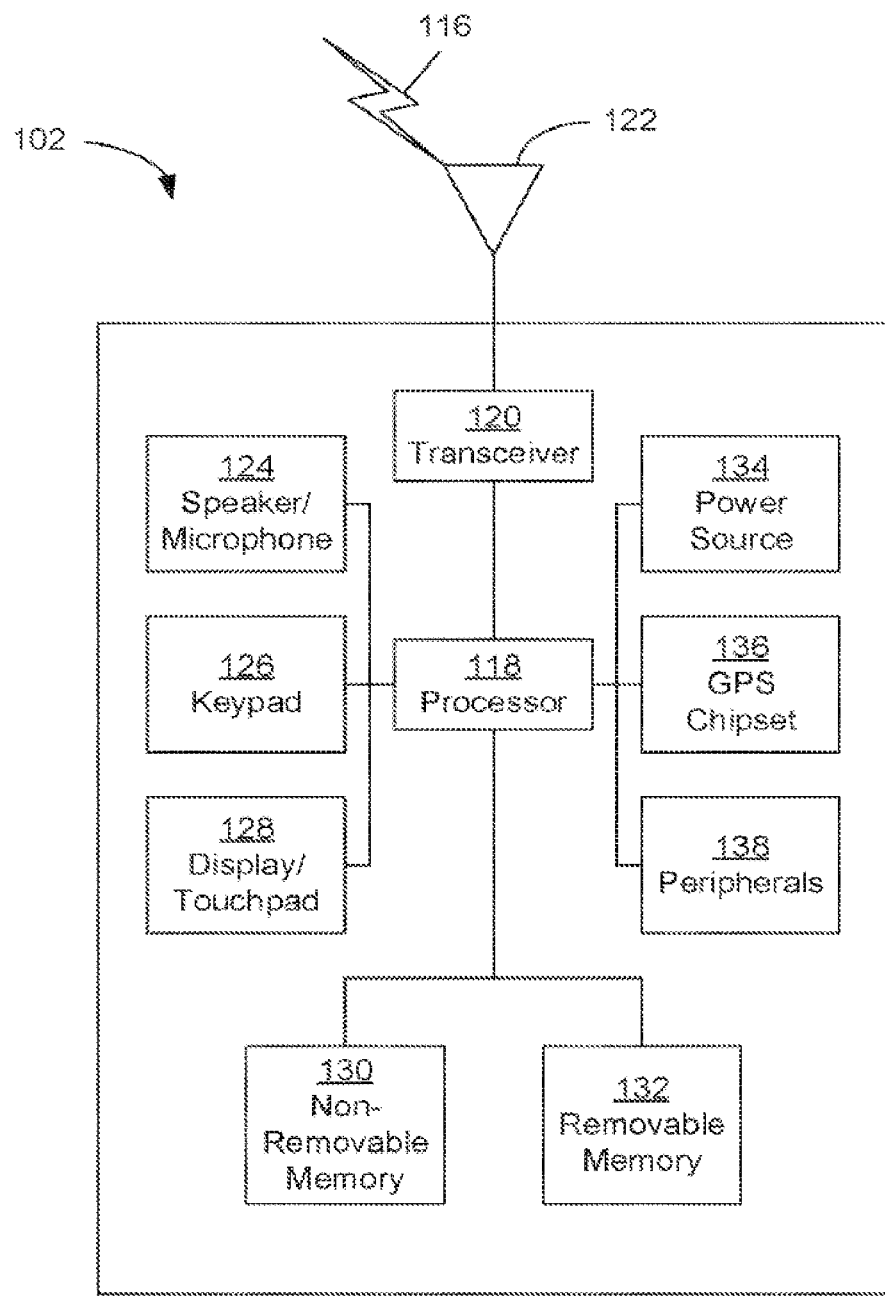
FIG. 1B is a system diagram of an example system illustrating an example wireless transmit/receive unit (WTRU) that may be used within the communications system illustrated in FIG. 1A according to some embodiments.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. The WTRU 102 may include any sub-combination of the foregoing elements while remaining consistent with an embodiment.

The processor 118 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. The transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLEO) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), and lithium-ion (Li-ion)), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

In view of FIGS. 1A-1B, and the corresponding description of FIGS. 1A-1B, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, ON 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Note that various hardware elements of one or more of the described embodiments are referred to as "modules" that carry out (perform or execute) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and those instructions may take the form of or include hardware (hardwired) instructions, firmware instructions, software instructions, and/or the like, and may be stored in any suitable non-transitory computer-readable medium or media, such as commonly referred to as RAM or ROM.

Overview

In many previous 360° video systems, the viewing direction used to display video in a head mounted display (HMO) with respect to a 360° video is the same direction as the HMO with respect to real space. Example embodiments may convert at least one input, the direction of the HMO with respect to real space, into an output, the direction of the HMO with respect to the 360° video. Such embodiments may use other inputs, such as viewing directions chosen by a director, by critics, or by other users. These multiple inputs may be handled differently depending on the events and scenarios under which the inputs are generated as well as which rules are applied to handle the inputs.

User directional input may be provided in various ways. For example, the user directional input may be provided automatically based on the physical direction of a viewing device (such as an HMO of the user) in real space, e.g. as determined by an inertial measurement unit (IMU) of the viewing device. The user directional input may alternatively be provided by another user input, such as a scrolling input on a touch screen, touch pad, joystick, or other input device.

In some embodiments, a current viewing direction for a time n+1 may be represented as [Direction w.r.t. 360° Video]n+i. An incremental change in that viewing direction may be a weighted sum of (i) an incremental change in user directional input ([Direction in Real Space]n+i–[Direction in Real Space]n) and (ii) a correction toward a current direction on the defined viewing path, where the correction may be calculated as ([Direction Chosen by Director]n+i–[Direction w.r.t. 360° Video]n). For example, the current viewing direction may be calculated as follows:

$$[\text{Direction w.r.t. 360° Video}]n+i = [\text{Direction w.r.t. 360° Video}]n + a*([\text{Direction in Real Space}]n+i - [\text{Direction in Real Space}]n) + b*([\text{Direction Chosen by Director}]n+i - [\text{Direction w.r.t. 360° Video}]n), \quad \text{Eqn. 1}$$

where a and b are constants. For one embodiment, a and b may be variables that depend on time.

In some embodiments, the current viewing direction is a weighted sum of (i) a current high-pass filtered version of the user directional input and (ii) a current direction of the defined viewing path. As one example using a two-tap high-pass filter, a high-pass filtered version of the user directional input may be ([Direction in Real Space]n+i–[Direction in Real Space]n). In such a case, the current viewing direction may be calculated as $$[\text{Direction w.r.t. 360° Video}]n+i = a*([\text{Direction in Real Space}]n+i - [\text{Direction in Real Space}]n) + [\text{Direction Chosen by Director}]n+i. \quad \text{Eqn. 2}$$

It may be noted that Eqn. 2 is the result of setting b=1 in Eqn. 1. However, for different types of high-pass filtering performed on the user directional input, different calculations may be performed to determine the viewing direction.

For one embodiment, Eqns. 3 and 4 list bounds on a and b:

$$0 \le a \le 1 \qquad \text{Eqn. 3}$$

$$0 \le b \le 1 \qquad \text{Eqn. 4}$$

Various constraints may be imposed on values of a and b, or the values of a and b may be separately varied.

To handle rollovers of directional degree values, offsets of 360° may be added to any of Eqn. 1's five terms that are shown after (or right on) the equal sign.

If a=1 and b=0 in Eqn. 1, the director's direction falls out, and Eqn. reduces to:

$$[\text{Direction w.r.t. } 360° \text{ Video}]n+i=[\text{Direction w.r.t.} \\ 360° \text{ Video}]n+[\text{Direction in Real Space}]n+i- \\ [\text{Direction in Real Space}]n \qquad \text{Eqn. 5}$$

Stated differently, a term in Eqn. 5 may be shifted to become Eqn. 6, which shows that directional changes with respect to a 360° video are equal to directional changes of the HMD in real space:

$$[\text{Direction w.r.t. } 360° \text{ Video}]n+i-[\text{Direction w.r.t.} \\ 360° \text{ Video}]n=[\text{Direction in Real Space}]n+i- \\ [\text{Direction in Real Space}]n \qquad \text{Eqn. 6}$$

If a=0 and b=1 in Eqn. 1, the HMD's direction in real space falls out, and Eqn. 1 reduces to:

$$[\text{Direction w.r.t. } 360° \text{ Video}]n+i=[\text{Direction Chosen} \\ \text{by Director}]n+i \qquad \text{Eqn. 7}$$

In the example of Eqn. 8, the direction with respect to the video approaches the director's chosen direction, with the factor b indicating how rapidly this is done. For low values of b, the direction with respect to the video more slowly approaches the director's chosen direction, while for higher values of b ($\le 1$), the direction more rapidly (or instantaneously, for b=1) follows the director's chosen direction.

$$[\text{Direction w.r.t. } 360° \text{ Video}]n+i=[\text{Direction w.r.t.} \\ 360° \text{ Video}]n+b*([\text{Direction Chosen by Director}]n+i-[\text{Direction w.r.t. } 360° \text{ Video}]n) \qquad \text{Eqn. 8}$$

Setting different values for a and b, such as a=0.3 and b=0.7, may be used to set different levels of automation.

Architecture

FIG. 2 shows one embodiment 200 of interfaces for process used to automate navigation of 360° videos. One process configures a watching profile 202. Another process prepares for automated navigation of 360° video 204. Another process outputs a 360° video 206. For one embodiment, configuring a watching profile 202 may include setting automation rules for events and setting prioritization of watching profiles. For one embodiment, preparing a 360° video for automated navigation 204 may include delivering watching profiles for a 360° video, extending watching profiles for special events, selecting watching profile meta-information, and delivery to a 360° video output module, a 360° video stream, periodic event data, and a full path for static events. For one embodiment, outputting a 360° video 206 may include outputting a user-directed 360° video segment and outputting an automated navigation of a 360° video segment.

One or more watching (or viewing) profiles may be generated that are used to control viewing direction of an HMO. For one embodiment, the HMO changes viewing direction quickly for fast gaze changes, but the HMO converges slowly back to the guided direction. A watching profile may indicate how fast an HMO changes viewing direction for user and director suggested viewing directions. For example, a watching profile may include a time series of values for a and b in Eqn. 1 that indicate the proportion of real space (user HMO direction) direction changes and director direction changes used to calculate the direction with respect to a 360° video. A watching profile may indicate if guided viewing is to be stopped if a user makes a quick glance away. A watching profile may indicate if guided viewing is to be continued for a long focus (or stare) by a user. A watching profile may indicate a "director's cut," a set of director's suggested viewing directions. A watching profile for a director's cut may have values of a=0 and b=1 in Eqn. 1.

During guided viewing, user HMO motion (direction in real space in Eqn. 1) may be combined with a suggested viewing path (direction chosen by a director in Eqn. 1). An automation level may be used to determine the viewing direction's relative weightings of the HMO orientation and the suggested path. For one embodiment, a watching profile may have a set of values for a and b in Eqn. 1 that indicate levels of automation. For example, a watching profile may have a set of pairs for a and b, such as:

$$(a,b)=\{(0.25,0.75),(0.5,0.5),(0.75,0.25)\} \qquad \text{Eqn. 9}$$

The three sets of pairs of values for a and b in Eqn. 9 may indicate 3 levels of automation.

A user may record a viewing track to resume or share a viewing experience. A recorded viewing track may indicate where to enter a 360° video by giving the gaze direction at each point in time. A user may load a previously stored watching profile and select that profile for setting the automation level and watching directions. For one embodiment, the gaze direction (direction in real space in Eqn. 1) may be stored for a series of time intervals, where n=1, 2, . . . N. For one embodiment, levels of automation may be stored in a watching profile as shown in Eqn. 9. For some embodiments, a watching profile may include a deviation threshold between a gaze direction and a spatiotemporal subset of the 360-degree video content (or 360-degree video) that forms a path through time and space. Such a deviation threshold may be expressed as a three-dimensional set of angle deviations. The deviation threshold may change with time for some embodiments.

For systems and methods disclosed herein, a tool may be used by a content author to describe enhanced methods for users to enjoy the content. A tool also may be used to set different automation levels of guided paths for 360° content. For example, a content author may indicate hard cuts which immediately redirect the viewport or may indicate entry points for a new scene. For one embodiment, hard cuts may be indicated in a watching profile with a series of pairs of values for a and b, where a=0 and b=1 for at least one pair of those series of values for a and b.

In various embodiments, the described modules may be implemented on different devices. For example, some modules described herein as being implemented by a client device may alternatively be implemented on a server.

Figure 3:
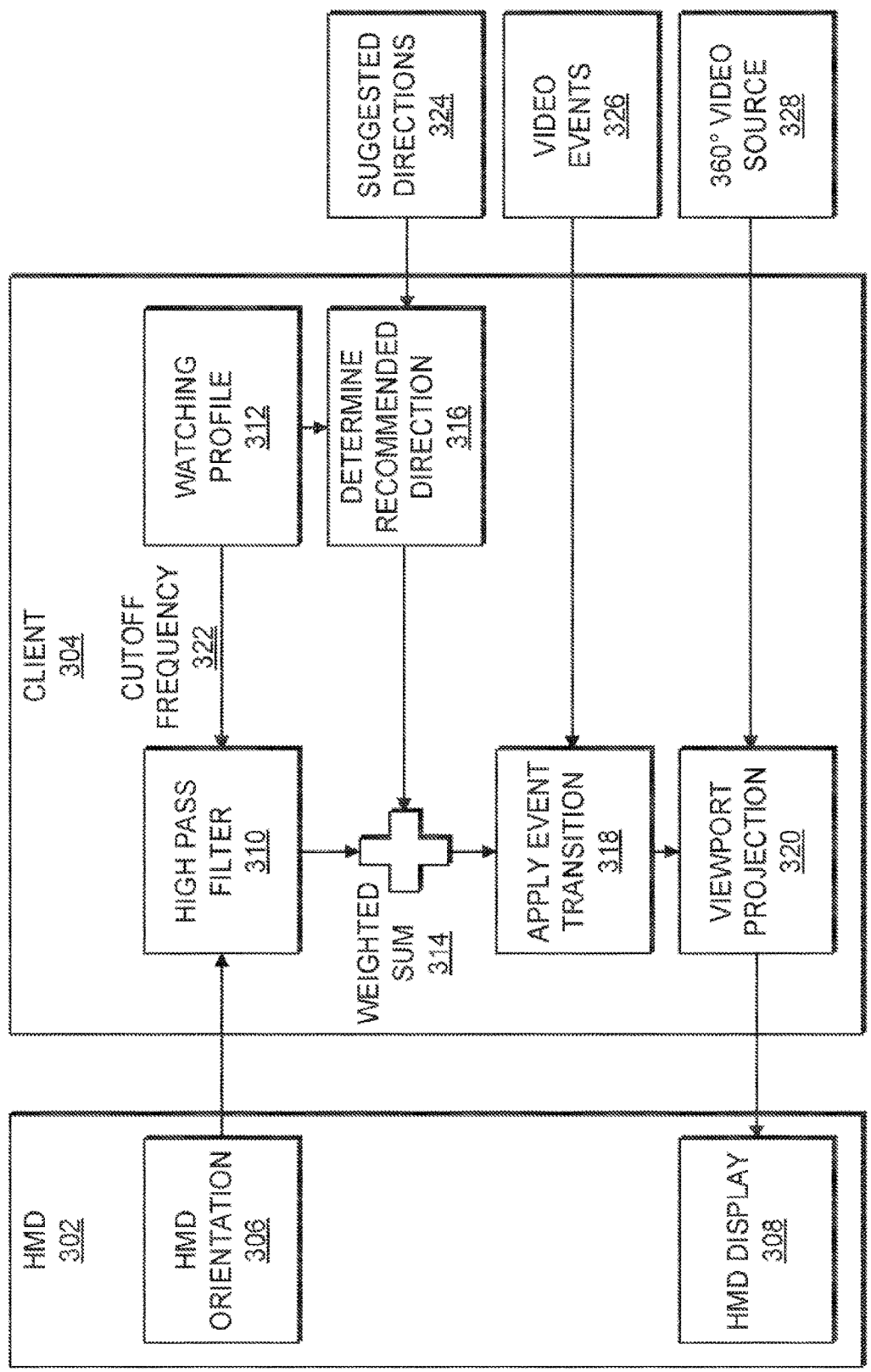
FIG. 3 is a system diagram illustrating an example set of interfaces for calculation of multiple levels of guided viewports for viewing a 360° video according to some embodiments.

FIG. 3 shows one embodiment 300 of a process for generating multiple levels of guided (or automated) viewports for viewing a 360° video. One or more watching profiles are generated. For one embodiment, a user selects a watching profile (not shown in FIG. 3). Suggested directions 324, which may originate with a server for one embodiment or a user for another embodiment, are communicated to a client 304. The suggested directions (which may be a direction chosen by a director as shown in Eqn. 1) and rules indicated in a watching profile may be used in determination of a recommended direction (or viewport). For one embodiment, a watching profile 312 may have a set of rules that are triggered by video events 326 or other scenarios. These rules may affect the values for a and b in Eqn. 1 and may affect the calculation (or determination) of a recommended direction or viewport of the 360-degree video content. For some embodiments, a recommended viewport may be determined for each available watching profile.

A watching profile 312 may include a cutoff frequency 322, which is sent to a high pass filter 310. For some embodiments, an orientation of the 360-degree video content viewing device may be measured to generate an orientation measurement. The head mounted display (HMO) 302 (or other 360-degree video content viewing device) may send information indicating measurement of its orientation to a high pass filter 310 to generate a filtered orientation measurement. The output of the high pass filter 310 is combined with the determined recommended direction 316 via a weighted sum function 314 to output a viewing direction. The weighted sum 314 may use a movement gain value (direction in real space in Eqn. 1) indicated in the watching profile 312. The movement gain value may indicate the relative proportions of the high pass filter output (such as a value for constant a used in Eqn. 1) and the determined recommended direction 316 (such as a value for constant b used in Eqn. 1) for the weighted sum function.

The presence of video events 326 are communicated to the client 304, and event transitions are applied 318 if a video event 326 occurs. With some embodiments, a client 304, HMO 302, or a 360-degree video content viewing device may receive information indicating a video event 326 within the 360-degree video content. The client 304, HMO 302, or 360-degree video content viewing device may determine a transition effect for handling the video event 326 and may perform the transition effect method (or generate information) for handling the video event 326. For one embodiment, an event transition is applied 326 to shift the viewing direction output to a direction correlated to the video event 326, which may be a series of pairs of values for a and b in Eqn. 1 where a=0 and b=1 for at least one pair of values. The 360° video source 328 is received by the client 304, and the client 304 generates a viewport projection 320 using the viewing direction output. The viewport projection 320 is outputted to the HMO display 308 to display the 360° video from the viewport projection 320. For some embodiments, a viewport (or viewport projection 320) of the 360-degree video content may be adjusted based on a determined recommended viewport.

With some embodiments, a viewport (or viewport projection 320) of the 360-degree video content may be adjusted based on an orientation measurement and/or a boundary threshold. In some embodiments, adjusting the viewport of the displayed 360-degree video content may include combining the filtered orientation measurement with a viewport of the 360-degree video content corresponding to a path through time and space for the selected watching profile, which may be the determined recommended direction 316. In some embodiments, adjusting a viewport of a displayed 360-degree video content may be based on an orientation measurement of a 360-degree video content viewing device. For some embodiments, adjusting the viewport of the displayed 360-degree video content may be based on a boundary threshold. With some embodiments, adjusting the viewport of the displayed 360-degree video content may be based on both an orientation measurement of a 360-degree video content viewing device and a boundary threshold. For example, a boundary threshold may limit viewing 360-degree video content beyond a compass heading, such as a compass heading of 30 degrees. If the user makes a head rotation beyond the 30-degree boundary threshold, the 360-degree video content viewing device may adjust a viewport of the 360-degree video content to track with further head rotations beyond the 30-degree boundary threshold.

The boundary threshold may be included within a level of guidance. A boundary threshold may enable a user to have a gaze direction of the 360-degree video content up to a boundary condition or threshold. For example, a user may be able to view 360-degree video content up to a particular compass heading or a particular location associated with displayed content. Displaying the 360-degree video content may include displaying one or more viewports of the 360-degree video content corresponding to a path through time and space for the selected watching profile.

Figure 4:
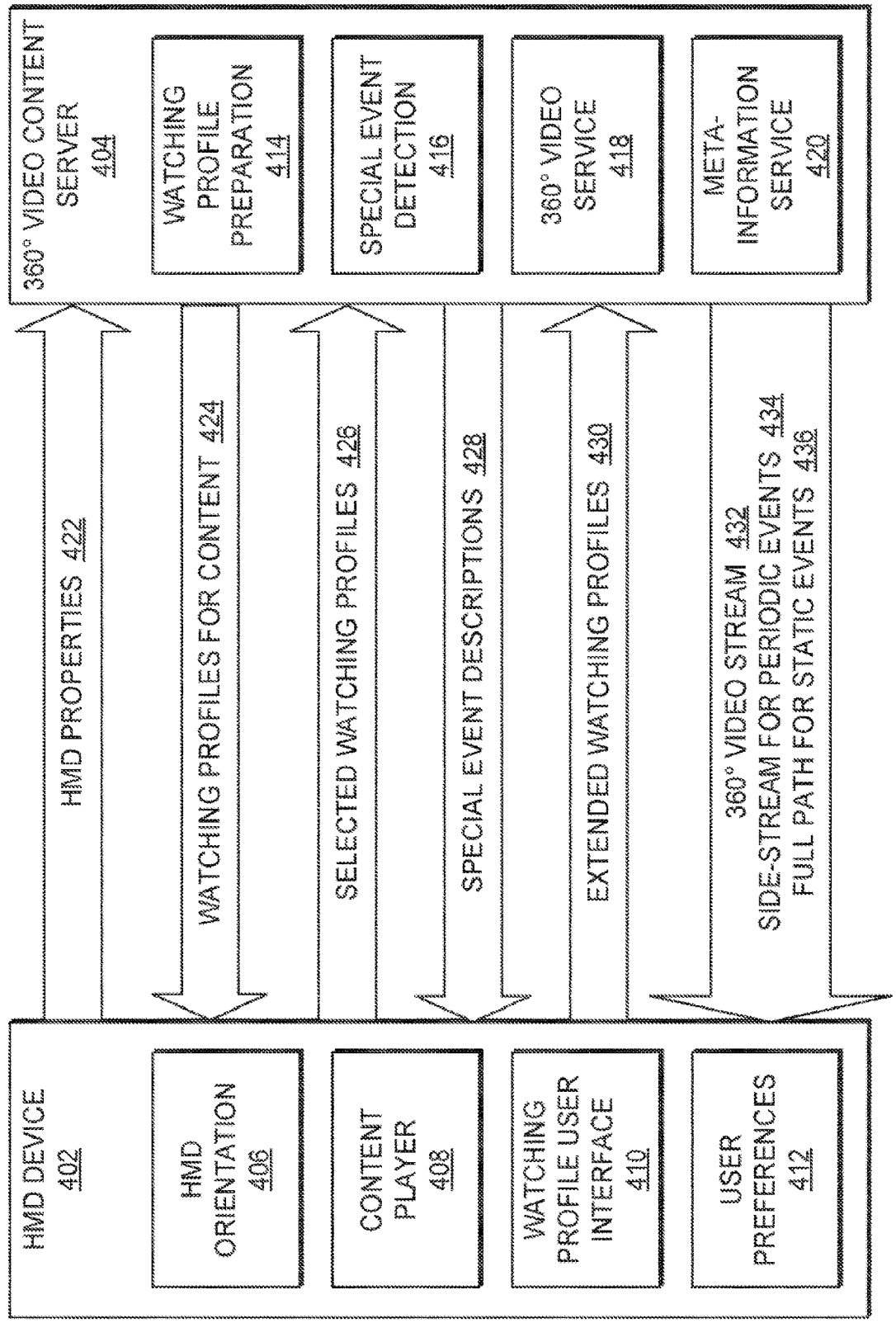
FIG. 4 is a system diagram illustrating an example set of interfaces for exchanging data between a 360° video content server and an HMO device according to some embodiments.

FIG. 4 shows a set 400 of communication interfaces between a 360° video content server 404 and an HMO device 402. For one embodiment, an HMO device 402 may have an Internet connection with the following modules: HMO orientation 406, content player 408, watching profile user interface 410, and user preferences 412. An HMO orientation module 406 may include a gyro sensor to determine an HMD's orientation. A content player 408 may be a module that is capable of playing 360° videos by using event descriptions and watching profiles. A watching profile user interface (UI) 410 may be a user interface that enables the user (or viewer) to create new watching profiles and to extend existing watching profiles. User preferences 412 may be stored in storage locations with watching profiles and used with viewing of 360° videos.

For one embodiment, a 360° video content server 404 may have the following modules: watching profile preparation 414, special event detection 416, 360° video service 418, and meta-information service 420. A watching profile preparation module 414 may be a service that is capable of preparing watching profiles for a selected 360° video content and for the capabilities of the used HMO. A special event detection module 416 may be a service that is capable of detecting events that are not handled (for which there are not specified automation rules) in the selected watching profile(s). A 360° video service module 418 may be a service that provides a 360° video stream for the selected 360° video content. A meta-information service 420 may provide meta-information (e.g., event descriptions) for the selected 360° video.

For one embodiment, an HMO 402 may send HMO properties 422, selected watching profiles 426, and extended watching profiles 430 to a 360° video content server 404, while a 360° video content server 404 may send watching profiles for content 424, special event descriptions 428, a 360° video stream 432, a side-stream for periodic events 434, and a full path for static events 436 to an HMO device 402. For some embodiments, a watching profile may include a spatiotemporal subset of 360-degree video content that comprises information highlighting spatial locations on a timeline of the 360-degree video content. For example, such information may include arrows or pointers to locations on the timeline. Such information also may include a listing of times within 360-degree video content when one or more video events occur.

360° Video Event Description

A 360° video event describes a type and location of an event in a 360° video in both time and direction. A 360° video event description may indicate a timeline for a 360° video. The timeline may be indicated as metadata. A 360° video event description may include event type, start time, and duration fields as well as optional fields region in 360° content, view path, and zoom level. One embodiment of the event type field may indicate the type of 360° video event and may have values such as "Director's View," "Critic's View," "North Direction," "Blooper," "Favorite Orientation," "Key Event in Movie," and "Goal." The start time field is the start time for an event, and an example may be "11:01." The duration field is the duration for an event, and an example may be "35 seconds." The region in 360° content field is an optional field that may indicate coordinates for a region in which an event occurs. The view path field is an optional field that may indicate a sequence of coordinates and timestamps for an event's view angle. The zoom-level field is an optional field that indicates a zoom-level of a 360° video for viewing an event.

For some embodiments, alternate initial entry viewing directions into a scene may be indicated for a scene cut event. Jump points and content rotations at a scene cut may be indicated so that the current viewing direction becomes the direction used for the new "north" direction for content. For one embodiment, constant b of Eqn. 1 may be set to zero for jumps, resulting in Eqn. 5.

360° Video Watching Profile Template

Watching profiles may be used to automate navigation of 360° videos. A watching profile may describe user selected actions to take in response to events for displaying a video in an HMO. A watching profile may contain watching profile selection parameters, 360° video experience conformance parameters, watching profile activation/deactivation parameters, and assisted 360° video experience rules. A watching profile may contain values (or a series of values) for constants a and b in Eqn. 1. For one embodiment, a watching profile may also contain values (or a series of values) for constants c and d in Eqn. 10:

$$[\text{Direction w.r.t. } 360° \text{ Video}]n+i=[\text{Direction w.r.t. } 360° \text{ Video}]n+a*([\text{Direction in Real Space}]n+i-[\text{Direction in Real Space}]n)+b*([\text{Direction Chosen by Director}]n+i-[\text{Direction w.r.t. } 360° \text{ Video}]n)+c*([\text{Direction Chosen by Critic}]n+i-[\text{Direction w.r.t. } 360° \text{ Video}]n)+d*([Dir. \text{ Chosen by Another Source}]n+i-[\text{Direction w.r.t. } 360° \text{ Video}]n) \quad \text{Eqn. 10}$$

For one embodiment, watching profiles may have values for only a and b, while for another embodiment, watching profiles may have values for only c and d. For one embodiment, a, b, c, and d may change with time, and a watching profile may have a series of values for a, b, c, and d that change with time. For one embodiment, a direction chosen by another source may be an average of directions chosen by a set of users viewing a 360° video.

For one embodiment, watching profile selection parameters may include name, automation level, and priority. The name field (which may have a value such as "Couch potato experience") indicates the name of a profile for identification purposes. The automation-level field (which may have a value such as "High," "Medium," and "Low") indicates the level of automation for adjusting viewing direction of a 360° video. The user may use the automation-level to select a watching profile. For example, the viewer may want to have a fully automatized 360° video experience and may select from watching profiles with an automation-level value of "High." The automation-level field may correlate to a set of pairs of values for variables a and b of Eqn. 1, such as the example shown in Eqn. 9. For the example of 3 levels of automation, a value of "High" may correlate to the first pair (a=0.25, b=0.75), a value of "Medium" may correlate to the second pair (a=0.5, b=0.5), and a value of "Low" may correspond to the third pair (a=0.75, b=0.25). The priority field (which may have values from 1 to 5) may be a watching profile's priority if multiple watching profiles are selected to be used for watching a 360° video. If automation rules conflict, the rule of the watching profile having the highest priory value may be executed.

Some embodiments are appropriate for use in content that has at least one positional degree of freedom, such as three-degree-of-freedom-plus (3DoF+) or six-degree-of-freedom (6DoF) content. In such embodiments, one or more predetermined positional paths may be available for selection by a user. Positional paths may be defined by a series of positional coordinates (e.g., x, y, z coordinates). A time stamp may also be provided for each set of coordinates unless the associated time may otherwise be inferred, e.g., by position of the coordinates within the series.

As an example, one such predetermined positional path may be a "Director" path. The user may select the "Director" path and may separately select a desired level of positional automation. If the user selects full positional automation, the content is displayed to the user using the (possibly time-varying) viewpoint position defined by the "Director" path. If the user selects partial positional automation, the viewpoint position may be a function of both the predetermined path and user positional input. In one embodiment, the viewpoint position may be determined as described in Eqn. 11.

$$[\text{Position w.r.t. } 360° \text{ Video}]n+i=[\text{Position w.r.t. } 360° \text{ Video}]n+g*([\text{Position in Real Space}]n+i-[\text{Position in Real Space}]n)+h*([\text{Position Chosen by Director}]n+i-[\text{Position w.r.t. } 360° \text{ Video}]n) \quad \text{Eqn. 11}$$

In some embodiments, levels of positional automation and directional automation may be different. For example, a user may choose full positional automation without directional automation, so that the user has no control over his viewpoint position (which is determined by the predetermined positional path) but complete control over viewing direction.

The user may provide positional input in various ways. For example, the user positional input may be provided automatically based on the physical position of a viewing device (such as an HMO of the user) in real space, the physical position of the user in real space (e.g. as determined by a camera system external to the user). The user positional input may alternatively be provided by another user input, such as a scrolling input on a touch screen, touch pad, joystick, or other input device.

For one embodiment, 360° video experience conformance parameters are optional. These parameters may affect the conformance of 360° video experience if a watching profile is used. Maximum panning speed is one conformance parameter that may constraint the effects indicated by watching rules. Maximum panning speed (which may have a value such as "50 degrees/second") may set the maximum speed for panning effects used by automation rules of a watching profile. For one embodiment, a maximum panning speed parameter may include a correlating set of values for constants a and b in Eqn. 1. For one embodiment, a watching profile may include limits on how much a direction with respect to a 360° video may change from one time interval to the next (from n to n+1). Such a rule may include a set of values to use for constants a and b in Eqn. 1. With some embodiments, a watching profile may include a limit on user interactivity, such as maximum panning speed, maximum angle of deviation from a viewport location, movement gain, a confinement of movement to an axis of movement, and a movement boundary. Maximum angle of deviation from a viewport location may be a maximum compass angle change from a current viewport location or a current gaze direction.

Movement gain may be relative to a direction in real space as shown in Eqn. 1. A confinement of movement to an axis of movement may confine movement within the 360-degree video content to movement along the x-axis, for example (or along the y- or z-axes). A movement boundary may include a stop on movement past a particular location associated with 360-degree video content, such as a wall for 360-degree video content of a room.

For one embodiment, watching profile activation/deactivation parameters may enable an HMO user to activate/deactivate a watching profile for watching a 360° video. The watching profile activation control field may indicate HMO user actions that activate a watching profile. For example, if the watching profile activation control field has a value of "little or no movement of HMO," little or no movement by an HMO user for a time period may activate a watching profile. Stated as an equation, if |[Direction w.r.t. Real Space]n+i−[Direction w.r.t. Real Space]n|<Threshold_LNM, a and b in Eqn. 1 may be set such that a=0 and b=1. A watching profile may set a value for threshold Threshold_LNM.

The watching profile deactivation control field may indicate HMO user actions that deactivate a watching profile. For example, if the watching profile deactivation control field has a value of "Quick Turns," quick turns by an HMO user may deactivate a watching profile. If the watching profile deactivation control field has a value of "Rapid Large Movements," rapid, large movements by an HMO user deactivate a watching profile. Stated as an equation, a watching profile may be deactivated if a change in HMO movement with respect to real space exceeds a threshold. If |[Direction w.r.t. RealSpace]n+1−[Direction w.r.t. Real Space]n|>Threshold_RLM, a and b in Eqn. 1 may be set such that a=1 and b=0. A watching profile may set a value for threshold Threshold_RLM. For some embodiments, a first watching profile may include a first deviation threshold between a path through time and space and a gaze direction of 360-degree video content, and a second watching profile may include a second deviation threshold between the path and the gaze direction. The first threshold may be less than the second threshold. The path through time and space may be a series of viewports of the 360-degree video content. The first and second thresholds may be equal to, for example, Threshold_LN M and Threshold_RLM, respectively, as shown above. The first and second thresholds may be associated with the level of guidance specified in each respective watching profile. For example, a first threshold may specify a low level of guidance on the user's viewport of 360-degree video content, and a second threshold may specify a high level of guidance on the user's viewport of 360-degree video content. The user may select a watching profile based on the level of guidance specified in the selected watching profile.

For one embodiment, assisted 360° video experience rules may include an automation rule with fields for event type, exclude other rules, and effects. The event type field indicates the type of event that may be used by an automation rule for performing an effect. Examples of event type field values may be "Actions in 360° Content," "Director's View," "Key Event in Movie," "Blooper," "Goal," "Ball Movement," and "Event Related to the Star Player of Soccer Team A." A value of "Actions in 360° Content" may indicate an event to pass information about actions at a specific time in 360° video content. A value of "Director's View" for event type may indicate that the automation rule indicates viewing directions of a 360° video recommended by a video's director (Direction Chosen by Director in Eqn. 1). A value of "Key Event in Movie" for event type may indicate a key event in a 360° movie. A value of "Blooper" for event type may indicate a mistake made by a member of the cast or crew. A value of "Goal" for event type may indicate a goal in a soccer event (or game). A value of "Ball Movement" for event type may indicate ball movement in a soccer game. A value of "Event Related to the Star Player of Soccer Team A" for event type may indicate an event related to the star player of the soccer team A. For one embodiment, an event type may correlate with a set of values for a and b in Eqn. 1 (or a, b, c, and d in Eqn. 10).

An automation rule with an exclude other rules field may have values of yes or no. This field may indicate that execution of the automation rule excludes execution of other conflicting rules. A value of yes may indicate that the automation rule of the watching profile with the higher priority is the rule that is executed.

An automation rule with an effects field may indicate that an effect is performed if a particular event occurs. An effects field with a value of "Panning Effect" may cause a smooth panning towards an event to make an event visible for a viewer. For one embodiment, a panning effect may include in a watching profile a series of corresponding values for a and b in Eqn. 1. An effects field with a value of "Hard Cut Effect" may cause a hard cut, where the content shown on the HMO abruptly jumps so that the indicated direction is aligned with the current direction of the HMO viewer. For one embodiment, hard cuts may be indicated in a watching profile with a series of pairs of values for a and b in Eqn. 1, where a=0 and b=1 for at least one pair of those series of values for a and b. An effects field with a value of "Zoom Effect" may cause a zooming in and panning towards an event in a 360° video. An effects field with a value of "Highlight Effect" may cause highlighting of an event in a 360° video. For example, colors and shapes may be used to emphasize and to make an event more visible for a viewer. An effects field with a value of "Show Direction Arrow" may cause a direction arrow to be displayed to guide a viewer to turn and see an event in a 360° video. An effects field with a value of "Vibration Alert" may cause a vibration alert to be displayed to notify a viewer of an event in a 360° video. An effects field with a value of "Additional Content Window" may cause the system to show an active event in an additional content window for the user. An effects field with a value of "Slight User Control On" may cause slight user rotations to affect the viewing direction after a panning or hard cut effect. For example, for an effects field value of "Slight User Control On," a watching profile may include values of a=0.5 and b=0.5 in Eqn. 1. An effects field with a value of "Slight User Control Off" may cause slight user rotations not to affect the viewing direction of a 360° video. For example, for an effects field value of "Slight User Control Off," a watching profile may include values of a=0 and b=1 in Eqn. 1.

360° Video Watching Profile Examples

Table 1 shows an example "Couch Potato" watching profile. For one embodiment, such a profile may include values for a and b in Eqn. 1 (or a, b, c, and d in Eqn. 10) as described above.

TABLE 1

Couch Potato Watching Profile Example

Watching Profile Selection Parameters:
　　Name: "Couch Potato Experience"
　　Automation-Level: "High"
　　Priority: "1"

TABLE 1-continued

Couch Potato Watching Profile Example

360° Video Experience Conformance Parameters
    Maximum Rotation Speed: "50 Degrees/Second"
Watching Profile Activation/Deactivation Parameters:
    Activation of Watching Profile: "Little or No Movement of HMO"
    Deactivation of Watching Profile: "Quick Turns" I "Rapid
    Large Movements"
Assisted 360° Video Experience Rules:
    Automation Rule:
        Event Type: "Director's View"
        Exclude Other Effects: "Yes"
        Effects:
            "Panning Effect"
            "Hard Cut Maximum 180 Degrees"
            "Slight User Control On"

A "Couch Potato" watching profile may be used by a user who generally follows a director's view of a 360° video and does not actively move or follow events but who may want the freedom to look in different directions within a 360° video. For instance, the playback of a 360° video may use a view path indicated by the director and may rotate the content to the direction that the HMO is currently facing. As a result, the viewer sees the view recommended by the director. However, the "Slight User Control" option may be used to enable a viewer to rotate the content slightly by moving his or her head after the content is rotated to the direction indicated in the view path.

The HMO displays content for a guided path but enables a user to look in slightly different directions than the guided path. A watching profile may indicate user actions to activate and deactivate the watching profile. For instance, the displayed view may be the director's viewport if the HMO user has little or no movement (which may activate the watching profile). The displayed view may be the user's viewing direction if the user makes large, rapid movements, such as quickly turning his or her head (which may deactivate the watching profile). For some embodiments, a watching profile may include a spatiotemporal subset of 360-degree video content that includes a path through time and space, and the path may include information used to determine a recommended viewport of the 360-degree video content. For some embodiments, a watching profile's spatiotemporal subset of 360-degree video content may include a first path through time and space that is associated with position of a user and a second path through time and space that is associated with viewing direction of the user. For some embodiments, a client or 360-degree video viewing device may receive two or more available watching profiles, with each available watching profile including information describing a path through time and space. The path for each watching profile may be different. For some embodiments, a level of guidance may include a quantity setting that indicates a quantity of three-dimensional paths through time and space. For example, a quantity setting of zero (or null) may indicate a user has full control of a viewport of the 360-degree video content. A quantity setting of one may indicate a user's motion through time and space is predetermined to move according to a path through time and space included in the level of guidance. A quantity setting of one may indicate a user's motion may be guided along a path through time and space for some time periods. A quantity setting of two may indicate a user's motion and a user's viewing direction are predetermined to move according to the respective first and second paths through time and space included in the level of guidance. For example, the user's motion may be associated with a user's torso movements, and a user's viewing direction may be associated with a user's head movements. For some embodiments, a device may direct a user to watch a spatiotemporal subset of 360-degree video content associate with a selected watching profile using a level of guidance specified by a selected watching profile such that a viewport of the displayed 360-degree video content is adjusted based on a path through time and space specified in the selected watching profile. For example, a user may select a watching profile with a level of guidance (such as low, middle, or high). The level of guidance may indicate the amount of deviation between gaze direction and a path through time and space associated with the 360-degree video content. A viewport of the displayed 360-degree video content may be adjusted if the user's gaze direction exceeds a deviation threshold. For example, if the user's gaze direction or head movement relative to the real space environment exceeds a deviation threshold, the viewport of the 360-degree video content may be adjusted to track with gaze direction changes or head movement changes that exceed the deviation threshold.

A watching profile may include a "Hard Cut Maximum 180 Degrees" effect if abrupt turns greater than 180 degrees are difficult for a user to perform. For a hard-cut effect, the content shown on an HMO device abruptly jumps so that the indicated direction is aligned with the current direction of the HMO viewer. The HMO may switch abruptly to show what is behind the viewer without a user abruptly rotating his or her head.

Table 2 shows an example "Fan of Soccer Team A" watching profile. For one embodiment, such a profile may include values for a and b in Eqn. 1 (or a, b, c, and d in Eqn. 10) as described above.

TABLE 2

"Fan of Soccer Team A" Watching Profile Example

Watching Profile Selection Parameters:
    Name: "Fan of Soccer Team A"
    Automation-Level: "Medium"
    Priority: "1"
360° Video Experience Conformance Parameters:
    Max Rotation Speed: "50 Degrees/Second"
Watching Profile Activation/Deactivation Parameters
    Activation of Watching Profile: "Little or No Movement of HMO"
    Deactivation of Watching Profile: "Quick Turns" I "Rapid
    Large Movements"
Assisted 360° Video Experience Rules:
    Automation Rule:
        Event Type: "Goal" I "Events Related to Star Players of
        Soccer Team A"
        Exclude Other Effects: "Yes"
        Effects:
            "Panning Effect"
            "Immediate Cuts to the Direction of Action"
            "Zoom"
            "Highlight Event"

A "Fan of Soccer Team A" watching profile may be used by a user who is a fan of soccer team A and who wants to actively follow Team A and not miss significant events related to star players of soccer team A. For this experience, the profile indicates effects for panning, immediate cuts to the direction of action, zooming, and event highlighting for the events indicated in the 360° video feed.

Table 3 shows an example "Follow the Ball" watching profile. For one embodiment, such a profile may include values for a and b in Eqn. 1 (or a, b, c, and d in Eqn. 10) as described above.

TABLE 3

"Follow the Ball" Watching Profile Example

Watching Profile Selection Parameters:
  Name: "Follow the Ball"
  Automation-Level: "Medium"
  Priority: "1"
Watching Profile Activation/Deactivation Parameters:
  Activation of Watching Profile: "Little or No Movement of HMO"
  Deactivation of Watching Profile: "Quick Turns" I "Rapid
  Large Movements"
Assisted 360° Video Experience Rules:
  Automation Rule:
    Event Type: "Ball Movement"
    Exclude Other Effects: "Yes"
    Effects:
      "Panning Effect"
      "Immediate Cuts to the Direction of Action"
      "Zoom"
      "Highlight Event"

A "Follow the Ball" watching profile may be used by a user who wants to follow the ball with minimal user effort to change viewing direction. This profile indicates effects for panning, immediate cuts to the direction of action, zooming, and event highlighting for the events indicated in the 360° video feed.

Table 4 shows an example "Follow the Action" watching profile. For one embodiment, such a profile may include values for a and b in Eqn. 1 (or a, b, c, and d in Eqn. 10) as described above.

TABLE 4

"Follow the Action" Watching Profile Example

Watching Profile Selection Parameters:
  Name: "Follow the Action"
  Automation-Level: "Medium"
  Priority: "1"
Watching Profile Activation/Deactivation Parameters:
  Activation of Watching Profile: "Little or No Movement of HMO"
  Deactivation of Watching Profile: "Quick Turns" I "Rapid
  Large Movements"
Assisted 360° Video Experience Rules:
  Automation Rule:
    Event Type: "Actions in 360° Content"
    Exclude Other Effects: "Yes"
    Effects:
      "Immediate Cuts to the Direction of Action"
      "Zoom"
      "Highlight Event"

A "Follow the Action" watching profile may be used by a user who wants to see the most interesting or significant actions with minimal user effort to change viewing direction. This profile indicates effects immediate cuts to the direction of action, zooming, and event highlighting for the events indicated in the 360° video feed.

Table 5 shows an example "Active User" watching profile. For one embodiment, such a profile may include values for a and b in Eqn. 1 (or a, b, c, and d in Eqn. 10) as described above.

TABLE 5

"Active User" Watching Profile Example

Watching Profile Selection Parameters:
  Name: "Active User Experience"
  Automation-Level: "Low"
  Priority: "1"

TABLE 5-continued

"Active User" Watching Profile Example

Watching Profile Activation/Deactivation Parameters:
  Activation of Watching Profile: "Little or No Movement of HMO"
  Deactivation of Watching Profile: "Quick Turns" I "Rapid
  Large Movements"
Assisted 360° Video Experience Rules:
  Automation Rule:
    Event Type: "Key Event in Movie"
    Exclude Other Effects: "Yes"
    Effects:
      "Show Direction Arrow"

An "Active User" watching profile may be used by a user who wants to actively follow a 360° video but do not want to miss significant events in the 360° video. This profile indicates to an HMO to display a direction arrow to guide the user to turn his or her head to view a significant event.

Messaging

Figure 5:
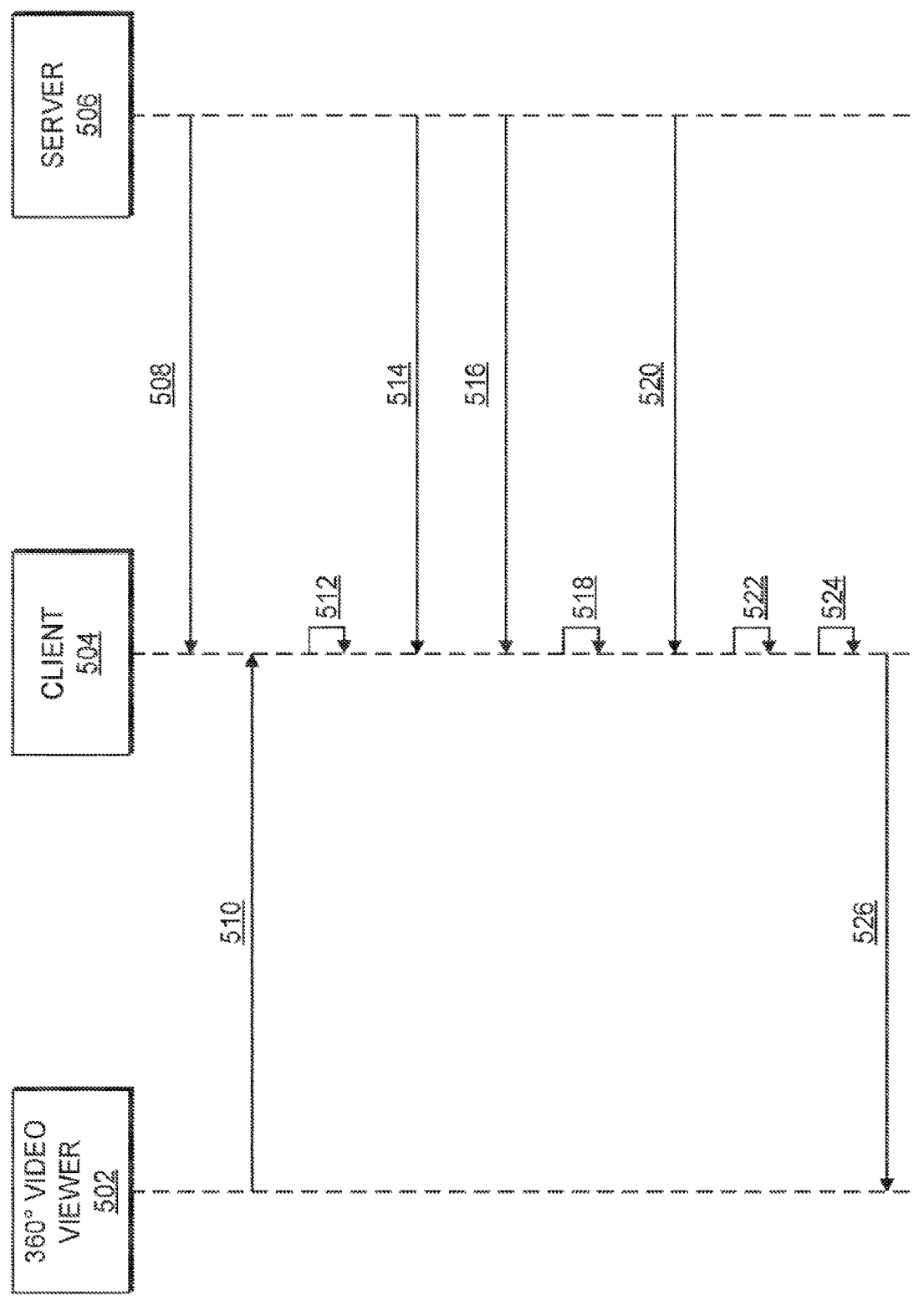
FIG. 5 is a message sequencing diagram illustrating an example process for a client to display a 360° video with a guided viewport according to some embodiments.

FIG. 5 is a message sequencing diagram 500 for one embodiment for viewing a 360° video with a guided navigation path. A server 506 may send 508 a selected watching profile to a client 504. A 360° video viewer 502 may send 510 messages with data indicating orientation of an HMO device. A client 504 may filter 512 the device orientation, such as with a high-pass filter. A server 506 may send 514 a 360° video stream to a client 504. Also, a server 506 may send 516 a recommended viewport to a client 504. A client 504 may compute 518 a guided viewport, which may be based on the 360° video stream and the recommended viewport. For one embodiment, calculation 518 of a guided viewport may include parsing one or more automation rules included in a watching profile, determining priority levels of automation rules, determining values to use for a and b in Eqn. 1 (or a, b, c, and d in Eqn. 10), and calculating a direction with respect to a 360° video. A server 506 may send 520 one or more video events to a client 504. A client 504 may execute 522 a viewport transition effect, which may be based on a rule in the selected watching profile. A viewport transition may include values to use for a and b in Eqn. 1 (or a, b, c, and d in Eqn. 10). A client 504 may calculate 524 a viewport for a 360° video, and the viewport may be sent 526 to the 360° video viewer 502.

Configuring a Watching Profile

Figure 6:
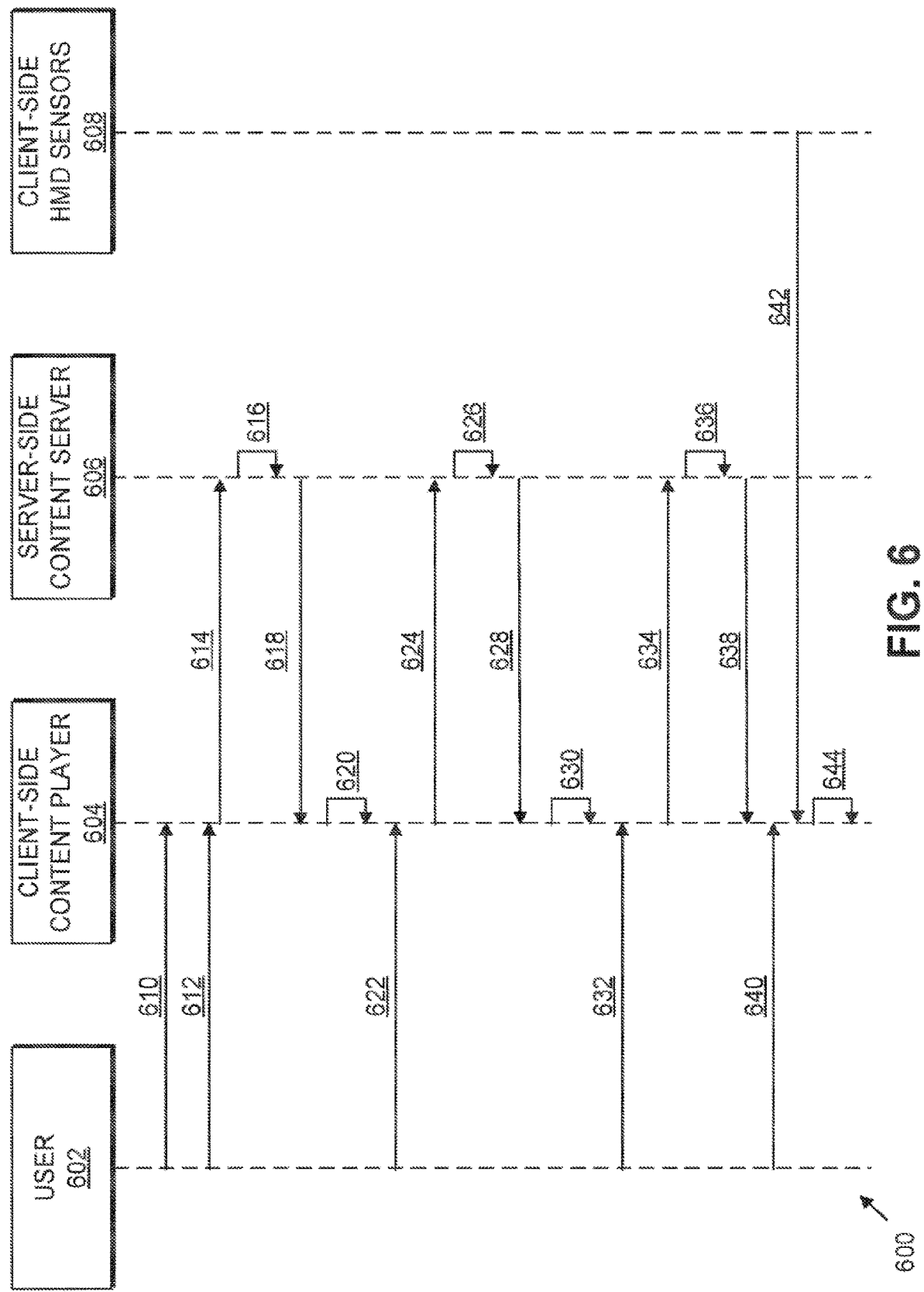
FIG. 6 is a message sequencing diagram illustrating an example process for a user viewing a 360° video with a guided viewport according to some embodiments.

FIG. 6 shows one embodiment of a message sequencing diagram 600 for automated navigation of 360° videos. For one embodiment, a user 602 sends 610 watching profile preferences and settings to a client-side content player 604. These preferences and settings may be used to create a watching profile for a navigation path of a 360° video. For one embodiment, a user 602 may have a default watching profile for viewing 360° videos. A default watching profile may be tailored for a specific 360° video. A user 602 may have multiple watching profiles, with a name for each profile. For one embodiment, a user interface enables a user 602 to set automation rules for events in a 360° video, which may be used to create a watching profile. For example, a user 602 may set an automation rule that indicates a "Panning Effect" and a "Zoom Effect" are to be performed for "Blooper" events in a 360° video. A watching profile may include values to use for a and b in Eqn. 1 (or a, b, c, and d in Eqn. 10) that correlate to automation rules included in the watching profile.

A user interface also may enable a user 602 to set priority levels for watching profiles so that a watching profile with the highest priority level may be used for viewing a 360° video. The user 602 may set automation rules to exclude execution of other automation rules. For example, an automation rule may prevent displaying of an additional content window when a panning effect is used for displaying certain events (such as a goal in a soccer game or a touchdown in a football game). For example, a watching profile with a panning effect rule may include values of a=0 and b=1 if the panning effect rule is executed. Such values for a and b may cause changes in the direction with respect to a 360° video to be equal to changes in the direction chosen by a director, such as in Eqn. 8.

For some embodiments, generating a watching profile's metadata may include generating information used to determine at least one recommended viewport of the 360-degree video content. For some embodiments, generating a watching profile's metadata describing a limit on user interactivity may include generating a deviation threshold between a path through time and space and a gaze direction of 360-degree video content. For some embodiments, generating a watching profile's metadata describing a spatiotemporal subset of 360-degree video content may include generating metadata describing a first path through time and space associated with torso movement of the user and generating metadata describing a second path through time and space associated with head movement of the user. For example, the first path may be similar to a set of rails that control movement associated with a user's torso movements through time and space, and the second path may be similar to a set of rails that control movement associated with a user's head movements through time and space. For example, a watching profile's path through time and space may be similar to a first person shooter video game in which the shooter (or user) is on rails.

User interface tools may enable a user to generate a watching profile as described herein. For example, a user interface may prompt a user to configure for a watching profile: a level of guidance, a deviation threshold for a level of guidance, one or more paths through time and space associated with 360-degree video content, variables a, b, c, and d indicated in Eq. 10, one or more limits on user interactivity associated with a watching profile, and one or more transition effect methods for handling a video event associated with the 360-degree video content. The user interface tools for generating a watching profile may be executed within a 360-degree video content viewing device display environment.

Preparation of Automated Navigation for 360° Video

A user 602 selects a 360° video to be played by an HMO device and the user's selection may be sent 612 to a content player 604. The content player 604 may send 614 a 360° video request, which may include an HMO profile of HMO capabilities, to a server-side content server 606.

Delivery of Watching Profiles for 360° Videos

A content server 606 may prepare 616 a watching profile for content. Watching profiles may be modified for the selected 360° video and for capabilities of an HMO (such as using automation rules that an HMO is capable of performing). A content server 606 may send 618 to a content player 604 a select watching profile request message, which may include watching profiles for content. A content player 604 may display 620 available watching profiles, which may include watching profiles tailored for the user 602. Such tailoring may include a set of values for a and b in Eqn. 1 (or a, b, c, and d in Eqn. 10). The user 602 may select watching profiles for automated navigation of the 360° video, and the selected watching profiles may be sent 622 to the content player 604. For some embodiments, a watching profile may include a spatiotemporal subset of 360-degree video content that includes at least one viewport of the 360-degree video content at a point in time within the 360-degree video content and at least one level of guidance may include a level of automated navigation to at least one viewport used in displaying the 360-degree video content. A watching profile may include metadata describing a limit on user interactivity and metadata describing a transition effect associated with a viewport of the 360-degree video content.

Extending of Watching Profiles for Special Events

A content player 604 may send 624 to a content server 606 a select watching profile response message, which may include the selected watching profiles. A 360° video may contain special events not yet managed in the selected watching profiles. For example, a 360° video broadcast of a soccer game may have an "event related to a star player" special event type. A content server 606 may generate 626 a notification of the special event for the selected watching profiles. A content server 606 may send 628 to a content player 604 an extend watching profile request that communicates a description of the special (unhandled) event(s) and the selected watching profiles. A content server 606 may modify a selected watching profile to handle the special event. Such a modification may include a set of values to use for a and bin Eqn. 1 (or a, b, c, and din Eqn. 10). The content player 604 may display 630 the special (unhandled) event(s) to alert the user 602 of the special event(s). The user 602 may interface 632 with the content player 604 to extend the watching profiles for the special event type. For example, the user 602 may extend the watching profiles with an automation rule for an "additional content window" effect that is executed when an "event related to a star player" special event type is detected. The content player 604 may send 634 to the content server 606 the extended watching profiles in an extend watching profile response message.

Watching Profile-Based Selection of Meta-Information

A content server 606 may use the extended watching profiles to prepare 636 meta-information for the events. The meta-information may be extracted from multiple sources that describe events related to the 360° video. For some embodiments, a method of generating a watching profile may include generating metadata describing a video event within 360-degree video content and generating metadata describing a transition effect method for handling a viewport associated with the video event. For example, a transition effect method may include a change in a viewport of the 360-degree video content such that a viewport of the displayed 360-degree video content is adjusted to show the video event within the viewport.

Delivery of 360° Video Stream, Periodic Events, and Full Path for Static Events

A content server 606 may send 638 to a content player 604 a 360° video response message, which may include a 360° video stream, a side-stream for displaying meta-information, and a full path for static events. Static events may include events that are identified prior to or when 360° video content is requested from a content server 606. A content server 606 may continually send 638 events to a content player 604. A content server 606 may send a set of values to use for a and b in Eqn. 1 (or a, b, c, and d in Eqn. 10) along with such events. Events may be sent at a set frequency rate. A periodic event delivery process may be used to send events detected in live 360° video content. For example, there may be 10 seconds of buffering for a 360° video stream of a soccer game. An event detection method may analyze video on a content server 606 and may send periodically, via a side-stream, detected events of the soccer game. A content server 606 may use the watching profile to select which static or periodic events are sent to a content player 604 and to prevent sending event descriptions for events not used in watching profiles. A side-stream of detected events may include values for a and b in Eqn. 1 (or a, b, c, and d in Eqn. 10).

Output of 360° Video

A user 602 may select an output mode and send 640 the selection to a content player 604. A content player 604 may display 644 a 360° video by using a watching profile and meta-information about events.

User-Directed Output of 360° Video

For one embodiment, a user-directed output mode may be selected to display a 360° video. An HMO sensor 608 may send 642 an HMO direction measurement to a content player 604. For a user-directed output mode, the HMO direction measurement may be used to control the displaying of a 360° video. An HMO direction measurement may be inserted into Eqn. 1 (or Eqn. 10) for the Direction in Real Space parameters. This mode may be used if there are no events directing the output of the 360° video or if a user 602 (viewer) has disabled the path-based output of 360° videos. If a user 602 has disabled a path-based output of 360° videos, values of a=1 and b=0 may be used in Eqn. 1, which may result in Eqn. 5.

Automated Output of 360° Video

An automated output mode may be selected to display a 360° video. For an automated output mode, 360° video content may set an associated north direction, a watching profile, and meta-information event descriptions for events in a 360° video. One embodiment of a process for an automated output of a 360° video may include detection of active events, selection of automation rules for active events, and execution of effects for selected automation rules. An event description may indicate the start time and duration of an event. The start time and duration may be used to detect (or identify) active events for playback. Automation rules of active watching profiles may be selected for active events. Selected automation rules may contain exclusionary automation rules and non-exclusionary automation rules. For exclusionary automation rules, the automation rule of a watching profile with a highest priority value may be selected for execution. For non-exclusionary automation rules, all selected automation rules may be executed. Automation rules may include values to use for a and b in Eqn. 1 (or a, b, c, and d in Eqn. 10).

Effects configured by selected automation rules may be executed. Automation rules may contain effects such as panning, hard cuts, zooming, highlighting, showing of a direction arrow, vibration alerts, addition content windows, and enabling and disabling of slight user control. For a "Panning Effect," a system may calculate a rendering direction from a content's north direction and a path description configured for an active event. A system may make a smooth orientation change to the calculated direction. For a "Hard Cut Effect," a system may calculate a rendering direction from a content's north direction and a path description configured for an active event. A system may make a rapid orientation change to the calculated direction. For a "Zoom Effect," a system may zoom content in or out as configured in a watching profile. For a "Highlight Effect," a system may highlight an active event (e.g., a tackle in a football game) in a 360° video view. For a "Show Direction Arrow" effect, a system may show a direction arrow that guides a user (or viewer) to rotate to a particular direction to see an active event. For a "Vibration Alert" effect, a system may display a vibration alert for an active event. For an "Additional Content Window" effect, a system may show an active event in an additional content window. For a "Slight User Control On" effect, a system may activate slight user control so that a user may make small orientation changes for the content by changing head position. The rendering direction may be calculated from a rendering direction setting and from the orientation (or direction) of the user. For one embodiment, a high pass filter may be applied to an HMO motion signal and the output of the filter may be added to the rendering direction. For a "Slight User Control Off" effect, a system may deactivate slight user control so that only a predefined rendering direction is used for displaying of content. As described earlier, effects included in a watching profile may include a corresponding set of values for a and b in Eqn. 1 (or a, b, c, and d in Eqn. 10).

Storing of User's View Path

For one embodiment, a system may continually store a user's viewing path (which may be a series of user viewing directions and timestamps) in the output of a 360° video. A user's viewing path may correspond to the Direction w.r.t. 360° Video parameters of Eqn. 1 (or Eqn. 10). This data may be used to enable a user to resume watching 360° video content if a watching session is interrupted. Stored view path information may enable a system to replay a 360° video experience.

Figure 7:
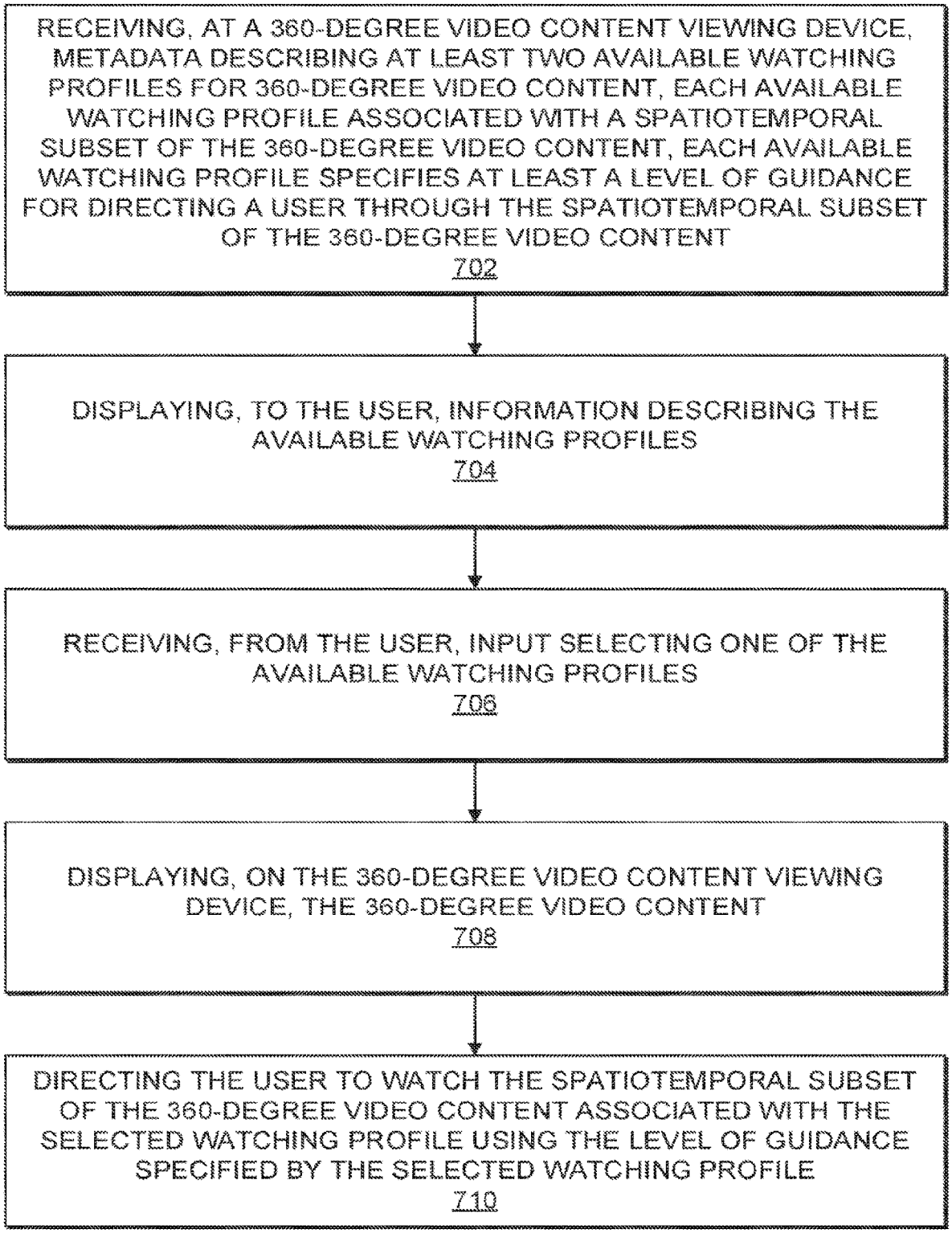
FIG. 7 is a flowchart illustrating an example process for displaying 360-degree video content and directing a user to watch a spatiotemporal subset of the 360-degree video content according to some embodiments.

FIG. 7 is a flowchart illustrating an example process for displaying 360-degree video content and directing a user to watch a spatiotemporal subset of the 360-degree video content according to some embodiments. For some embodiments, a method 700 may include receiving 702, at a 360-degree video content viewing device, metadata describing at least two available watching profiles for 360-degree video content, each available watching profile associated with a spatiotemporal subset of the 360-degree video content, each available watching profile specifies at least a level of guidance for directing a user through the spatiotemporal subset of the 360-degree video content. The method 700 may further include displaying 704, to the user, information describing the available watching profiles. The method 700, may include receiving 706, from the user, input selecting one of the available watching profiles. The method 700 may include displaying 708, on the 360-degree video content viewing device, the 360-degree video content, and directing 710 the user to watch the spatiotemporal subset of the 360-degree video content associated with the selected watching profile using the level of guidance specified by the selected watching profile. For some embodiments, a device that includes a processor and a non-transitory computer-readable medium storing instructions that are operative when executed on the processor to perform the method 700. Some embodiments of the device may be capable of performing any of the methods disclosed herein.

FIG. 8 is a flowchart illustrating an example process for generating watching profile metadata for 360-degree video content according to some embodiments. For some embodiments, a method 800 may include generating 802, for each of two or more available watching profiles, metadata describing a spatiotemporal subset of 360-degree video content. The method 800 may further include generating 804, for each of the at least two available watching profiles, metadata describing at least one level of guidance for directing a user through the spatiotemporal subset of the 360-degree video content. For some embodiments, the method 800 also may include generating, for each of two or more available watching profiles, metadata describing a limit on user interactivity, and generating, for each of two or more available watching profiles, metadata describing a transition effect method for guiding a user to a viewport of the 360-degree video content.

Use Cases

For one embodiment, output of a 360° video (Direction w.r.t. 360° Video in Eqns. 1 or 10) may be adjusted for user type (such as active or passive HMO users). For one embodiment, a system may provide multiple viewing angles (or perspectives) of 360° video content. Multiple viewing angles may correspond to the *Direction Chosen by Director, Direction Chosen by Critic*, and *Direction Chosen by Another Source* parameters of Eqn. 10. For one embodiment, multiple viewing angles may include a set of values for a, b, c, and d in Eqn. 10 (or a and b in Eqn. 1). For one embodiment, a 360° video experience output may include viewing angle changes that exceed 360° and that many immersive 360° videos are unable to perform. For one embodiment, a selected watching profile may be used to select meta-information (e.g., timeline information) that is sent to a client (or content player).

While the methods and systems in accordance with some embodiments are discussed in the context of virtual reality (VR), some embodiments may be applied to mixed reality (MR)/augmented reality (AR) contexts as well. Also, although the term "head mounted display (HMO)" is used herein, some embodiments may be applied to a wearable device (which may or may not be attached to the head) capable of, e.g., VR, AR, and/or MR for some embodiments.

Although features and elements are described herein in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
   receiving a video content;
   receiving information identifying a recommended viewing path providing recommended viewing directions through the received video content;
   when an automation level of a viewing direction is set to a partial directional automation level, determining a viewing direction through the video content, the viewing direction is determined based on a user directional input providing a viewing direction of a user viewing the video content and based on a current viewing direction on the recommended viewing path wherein the automation level of the viewing direction indicates an amount of deviation allowed between the user directional input and the recommended viewing path; and
   displaying to the user a viewport of the video content according to the determined viewing direction through the video content.

2. The method of claim 1, wherein the determining of the viewing direction through the video content comprises:
   determining an incremental change in the viewing direction based on a weighted sum of (i) an incremental change in the user directional input and (ii) a correction toward the current viewing direction on the recommended viewing path.

3. The method of claim 2, wherein the determining of the viewing direction through the video content comprises:
   filtering the user directional input, by a high-pass filter, to obtain the incremental change in the user directional input.

4. The method of claim 1, wherein the determining of the viewing direction through the video content comprises:
   constraining the viewing direction to a predetermined maximum angle of deviation from the recommended viewing path.

5. The method of claim 1, wherein the displaying of a viewport of the video content comprises:
   displaying a viewport of the video content that is centered on the determined viewing direction.

6. The method of claim 1, wherein the user directional input comprises measurements, each of a direction of a display device, displaying the video content, with respect to a real space.

7. The method of claim 6, wherein the display device is a head-mounted display.

8. The method of claim 1, further comprising:
   when the automation level of the viewing direction is set to a full directional automation level, determining, based on the recommended viewing path, the viewing direction through the video content.

9. The method of claim 1, wherein the information identifying the recommended viewing path comprises a plurality of view angle coordinates associated with respective times.

10. The method of claim 1, wherein the receiving of information identifying the recommended viewing path is performed in response to a user selection of one of at least two available viewing paths through the video content.

11. The method of claim 1, further comprising:
    prior to the determining of the viewing direction, displaying information describing available levels of automation of the viewing direction.

12. The method of claim 1, wherein the video content comprises content having at least one positional degree of freedom, and wherein the recommended viewing path comprises a recommended positional path through the content, the method further comprising:
    when an automation level of a viewpoint position is set to a partial positional automation level, determining a viewpoint position through the video content, the viewpoint position is determined based on a user positional input providing a viewpoint position of a user viewing the video content and based on a current viewpoint position on the recommended positional path,
    wherein the video content is displayed using the determined viewpoint position.

13. The method of claim 12, wherein the determining of the viewpoint position through the video content comprises:
    determining, based on (i) an incremental change in the user positional input and (ii) a correction toward the positional path, the viewpoint position through the video content.

14. The method of claim 12, further comprising:
    when the automation level of the viewpoint position is set to a full positional automation level, determining, based on the positional path, the viewpoint position through the video content.

15. A method comprising:
receiving a video content including content having at least one positional degree of freedom;
receiving information identifying a recommended viewing path through the received video content, wherein the recommended viewing path includes a respective recommended positional path providing recommended viewpoint positions through the video content;
when an automation level of a viewpoint position is set to a partial positional automation level, determining a viewpoint position through the video content, the viewpoint position is determined based on a user positional input providing a viewpoint position of a user viewing the video content and based on a current viewpoint position on the recommended positional path; and
displaying to the user a viewport of the video content according to the determined viewpoint position through the video content.

16. The method of claim 15, wherein the determining of the viewpoint position through the video content comprises:
determining, based on (i) an incremental change in the user positional input and (ii) a correction toward the positional path, the viewpoint position through the video content.

17. The method of claim 15, further comprising:
when the automation level of the viewpoint position is set to a full positional automation level, determining, based on the positional path, the viewpoint position through the video content.

18. A system, comprising:
at least one processor; and
memory storing instructions that, when executed by the at least one processor, cause the system to:
receive a video content,
receive information identifying a recommended viewing path providing recommended viewing directions through the received video content,
when an automation level of a viewing direction is set to a partial directional automation level, determine a viewing direction through the video content, the viewing direction is determined based on a user directional input providing a viewing direction of a user viewing the video content and based on a current viewing direction on the recommended viewing path, wherein the automation level of the viewing direction indicates an amount of deviation allowed between the user directional input and the recommended viewing path, and
display to the user a viewport of the video content according to the determined viewing direction through the video content.

19. A system, comprising:
at least one processor; and
memory storing instructions that, when executed by the at least one processor, cause the system to:
receive a video content including content having at least one positional degree of freedom,
receive information identifying a recommended viewing path through the received video content, wherein the recommended viewing path includes a respective recommended positional path providing recommended viewpoint positions through the video content,
when an automation level of a viewpoint position is set to a partial positional automation level, determine a viewpoint position through the video content, the viewpoint position is determined based on a user positional input providing a viewpoint position of a user viewing the video content and based on a current viewpoint position on the recommended positional path, and
display to the user a viewport of the video content according to the determined viewpoint position through the video content.

20. A non-transitory computer-readable medium comprising instructions executable by at least one processor to perform a method, the method comprising:
receiving a video content;
receiving information identifying a recommended viewing path providing recommended viewing directions through the received video content;
when an automation level of a viewing direction is set to a partial directional automation level, determining a viewing direction through the video content, the viewing direction is determined based on a user directional input providing a viewing direction of a user viewing the video content and based on a current viewing direction on the recommended viewing path, wherein the automation level of the viewing direction indicates an amount of deviation allowed between the user directional input and the recommended viewing path; and
displaying to the user a viewport of the video content according to the determined viewing direction through the video content.

21. A non-transitory computer-readable medium comprising instructions executable by at least one processor to perform a method, the method comprising:
receiving a video content including content having at least one positional degree of freedom;
receiving information identifying a recommended viewing path through the received video content, wherein the recommended viewing path includes a respective recommended positional path providing recommended viewpoint positions through the video content;
when an automation level of a viewpoint position is set to a partial positional automation level, determining a viewpoint position through the video content, the viewpoint position is determined based on a user positional input providing a viewpoint position of a user viewing the video content and based on a current viewpoint position on the recommended positional path; and
displaying to the user a viewport of the video content according to the determined viewpoint position through the video content.

* * * * *